US012297093B2

(12) United States Patent
Wach et al.

(10) Patent No.: US 12,297,093 B2
(45) Date of Patent: May 13, 2025

(54) AUTOMATED BEVERAGE DISPENSING SYSTEM

(71) Applicant: Miso Robotics, Inc., Pasadena, CA (US)

(72) Inventors: Ryan R. Wach, Valencia, CA (US); Ziwei Zheng, Los Angeles, CA (US); Benjamin Brinton Jordan, Sammamish, WA (US); Troy M. Swartwood, Seattle, WA (US)

(73) Assignee: Miso Robotics, Inc., Pasadena, CA (US)

( * ) Notice: Subject to any disclaimer, the term of this patent is extended or adjusted under 35 U.S.C. 154(b) by 237 days.

(21) Appl. No.: 17/950,283

(22) Filed: Sep. 22, 2022

(65) Prior Publication Data

US 2023/0096441 A1 Mar. 30, 2023

Related U.S. Application Data

(60) Provisional application No. 63/322,620, filed on Mar. 22, 2022, provisional application No. 63/249,756, filed on Sep. 29, 2021, provisional application No. 63/248,291, filed on Sep. 24, 2021.

(51) Int. Cl.
*B67D 1/12* (2006.01)
*B67D 1/08* (2006.01)

(52) U.S. Cl.
CPC ......... *B67D 1/0878* (2013.01); *B67D 1/1227* (2013.01); *B67D 2210/00076* (2013.01); *B67D 2210/00078* (2013.01)

(58) Field of Classification Search
CPC ................ B67D 1/0878; B67D 1/1227; B67D 2210/00076; B67D 2210/00078
See application file for complete search history.

(56) References Cited

U.S. PATENT DOCUMENTS

| | | | | |
|---|---|---|---|---|
| 3,838,805 | A | 10/1974 | Amberg | |
| 4,050,971 | A | 9/1977 | Verkins et al. | |
| 4,628,974 | A * | 12/1986 | Meyer | B67D 1/0021 901/17 |
| 4,949,526 | A | 8/1990 | Brogna et al. | |
| 5,000,345 | A | 3/1991 | Brogna et al. | |
| 5,967,367 | A | 10/1999 | Orsborn | |
| 6,053,359 | A | 4/2000 | Goulet et al. | |
| 6,082,419 | A | 7/2000 | Skell et al. | |

(Continued)

FOREIGN PATENT DOCUMENTS

WO 2023049795 A1 3/2023

OTHER PUBLICATIONS

Internation Search Report and Written Opinion PCT/US22/76851, dated Jan. 20, 2023.
Miso Robotics Inc., Newsroom publication (Jun. 22, 2021).

*Primary Examiner* — Jason K Niesz

(74) *Attorney, Agent, or Firm* — Batt IP A Law Corporation; Richard Batt

(57) ABSTRACT

Described herein is an automated beverage dispensing system for dispensing a beverage into a cup based on an order. The automated beverage dispenser may include a conveyor and a plurality of functional stations along the conveyor route. Exemplary stations include a cup singulation or placement station, an ice dispensing station, a beverage dispensing station, and a sealing station for covering the top of the cup with a liquid tight film. Related methods are described.

22 Claims, 32 Drawing Sheets

(56) References Cited

U.S. PATENT DOCUMENTS

| | | | |
|---|---|---|---|
| 6,102,246 | A | 8/2000 | Goulet et al. |
| 7,845,375 | B2 | 12/2010 | Dorney |
| 8,459,176 | B2 | 6/2013 | Nevarez et al. |
| 8,606,396 | B2 | 12/2013 | Claesson et al. |
| 8,672,534 | B2 | 3/2014 | Nevarez et al. |
| 9,045,323 | B2 | 6/2015 | Crane et al. |
| 9,141,562 | B2 | 9/2015 | Pickett et al. |
| 9,150,366 | B2 | 10/2015 | Rudick et al. |
| 9,227,830 | B2 | 1/2016 | Angus et al. |
| 9,259,114 | B2 | 2/2016 | Nevarez et al. |
| 9,290,371 | B2 | 3/2016 | Crane et al. |
| 9,327,958 | B2 | 5/2016 | Angus et al. |
| 9,364,114 | B2 | 6/2016 | Claesson et al. |
| 9,489,791 | B2 | 11/2016 | Chang |
| 9,511,988 | B2 | 12/2016 | Hernandez et al. |
| 9,622,615 | B2 | 4/2017 | Hecht et al. |
| 9,624,460 | B2 | 4/2017 | Wunder |
| 9,695,031 | B2 | 7/2017 | Whittard |
| 9,932,216 | B2 | 4/2018 | Hernandez et al. |
| 9,944,472 | B2 | 4/2018 | Crane et al. |
| 9,994,340 | B2 | 6/2018 | Angus et al. |
| 10,239,742 | B2 | 3/2019 | Dresser et al. |
| 10,319,175 | B2 | 6/2019 | Ditrani |
| 10,395,464 | B2 | 8/2019 | Van Den Driessche |
| 10,689,240 | B1 | 6/2020 | Schultz et al. |
| 10,689,241 | B2 | 6/2020 | Dresser et al. |
| 10,793,412 | B2 | 10/2020 | Ratti |
| 11,046,572 | B2 | 6/2021 | Edwards et al. |
| 11,053,109 | B2 | 7/2021 | Knight et al. |
| 11,117,793 | B1 | 9/2021 | Khan et al. |
| 11,358,742 | B2 | 6/2022 | Vari |
| 11,412,884 | B2 | 8/2022 | Herbert et al. |
| 11,472,579 | B2 | 10/2022 | Cittadino et al. |
| 11,548,667 | B2 | 1/2023 | Cittadino et al. |
| 2011/0189358 | A1 | 8/2011 | Herbert |
| 2013/0220480 | A1 | 8/2013 | Angus et al. |
| 2014/0001195 | A1 | 1/2014 | Patterson et al. |
| 2015/0353337 | A1 | 12/2015 | Chase et al. |
| 2017/0293983 | A1 | 10/2017 | Long, II |
| 2018/0201492 | A1 | 7/2018 | Jung et al. |
| 2019/0337732 | A1 | 11/2019 | Yoder et al. |
| 2020/0172272 | A1 | 6/2020 | Cittadino et al. |
| 2020/0231311 | A1 | 7/2020 | Vari |
| 2020/0255278 | A1* | 8/2020 | O'Nan ................. B67D 1/0888 |
| 2020/0270115 | A1 | 8/2020 | Schultz et al. |
| 2020/0299122 | A1 | 9/2020 | Bissen et al. |
| 2020/0317498 | A1 | 10/2020 | Dresser et al. |
| 2021/0009402 | A1 | 1/2021 | Moskowitz |
| 2021/0078848 | A1 | 3/2021 | Nocchi et al. |
| 2021/0087045 | A1 | 3/2021 | Carignan et al. |
| 2021/0292016 | A1 | 9/2021 | Peters et al. |
| 2022/0106181 | A1 | 4/2022 | Miller et al. |

* cited by examiner

AUTOMATED BEVERAGE DISPENSING SYSTEM

CROSS-REFERENCE TO RELATED APPLICATIONS

This application claims priority to provisional application No. 63/248,291, filed Sep. 24, 2021, entitled "AUTOMATED BEVERAGE DISPENSING SYSTEM"; provisional application No. 63/249,756, filed Sep. 29, 2021, entitled "AUTOMATED BEVERAGE DISPENSING SYSTEM"; and provisional application No. 63/322,620, filed Mar. 22, 2022, entitled "AUTOMATED BEVERAGE DISPENSING SYSTEM", each of which is incorporated herein by reference in their entirety for all purposes.

BACKGROUND OF THE INVENTION

1. Field of the Invention

This invention relates to beverage dispensing systems, and more particularly, to automated beverage systems adapted to automatically provide a freshly dispensed beverage per customer order.

DESCRIPTION OF RELATED ART

In the restaurant environment, beverages are prepared by restaurant employees using a conventional fountain drink station. The restaurant employee takes an order, manually places the cup under the fountain nozzle, and fills the cup with a beverage according to the customer order. The process relies heavily on employee labor, is slow, and is not scalable for multiple orders.

There is therefore a need for an improved beverage dispensing system, and particularly, one that is automated and can prepare multiple beverages in parallel.

SUMMARY OF THE INVENTION

In embodiments of the invention, an automated beverage dispensing system for dispensing a beverage and ice into a cup includes a conveyor assembly defining a conveyor route and operable to move a plurality of cup holder assemblies along the route. A plurality of functional stations are located along the conveyor route including a cup singulation station for placing a cup into the cup holder, an ice dispensing station, a beverage dispensing station, a cover sealing station, and a staging station or area.

In embodiments of the invention, additional functional stations are located along the route such as a printing or labeling station.

In embodiments of the invention, the automated beverage dispensing system includes a computer system and electronics programmed and operable to control the conveyor assembly each functional station.

In embodiments of the invention, the automated beverage dispensing system includes a touchscreen display in communication with the computer system and is operable to, amongst other things, receive a customer order, display current orders in progress, and display an order queue.

In embodiments of the invention, the computer system and electronics are programmed and operable to, in response to a request for a beverage from the display or another type of input device: (a) place an appropriately sized cup within the cup holder; (b) advance the cup to the ice dispensing station and dispense the appropriate predetermined volume of ice; (c) advance the cup to a beverage dispensing station and dispense the appropriate predetermined volume of the desired beverage; (d) advance the cup to the cover sealing station and cover the cup; (e) advance the sealed cup to a staging area; and optionally visually indicate cups of the same order in the staging area.

In embodiments of the invention, the computer system and electronics are programmed and operable to, after the beverage dispensing step, top off the ice/beverage mixture with an additional volume of beverage until the level of mixture in the cup is within a threshold distance from the rim of the cup. In embodiments, the threshold distance ranges from ¼ to ½ inch.

In embodiments of the invention, a method includes the steps of (a) placing an appropriately sized cup within a cup holder; (b) dispensing the appropriate predetermined volume of ice into the cup; (c) dispensing the appropriate predetermined volume of the desired beverage into the cup; (d) covering the cup; (e) advancing the sealed cup to a staging area; and optionally (f) visually indicating cups of the same order in the staging area.

In embodiments, an automated beverage dispensing system comprises the advantage and capability to (a) lift the entire cup holder assembly for various functional steps, and optionally, to (b) free float the entire cup holder assembly for weighing.

In embodiments, a cup holder assembly comprises a cup holder and a cup substrate. Optionally, the cup holder assembly comprises at least one rod that cooperatively engages the conveyor such that (a) the conveyor can carry the cup holding assembly along the conveyor route, (b) lift the cup holder and cup from the conveyor for various functional steps, and (c) freely float the entire cup assembly for weighing.

In embodiments, a conveyor assembly comprises a frame or plate, chain, gears, and motor. The motor and conveyor can be mounted to the plate. Optionally, plate is mounted on linear slides so that the entire conveyor assembly can be extended from beneath the functional stations for service as a single integrated piece.

In embodiments, in addition to forward motion, the motor can be operated in reverse or variable speed to adjust the direction and speed of the conveyor during operation.

In embodiments, a method for topping off a beverage/ice mixture includes weighing the mixture of the ice and beverage, and computing the amount for topping off. In embodiments, the computing is performed without measuring the weight of the ice.

In embodiments, a non-transitory storage medium for dispensing beverages has a set of computer-readable instructions stored thereon for singulating a cup, dispensing ice into the cup, dispensing beverage into the cup, sealing the cup, and presenting the sealed cup in a staging area.

The description, objects and advantages of the present invention will become apparent from the detailed description to follow, together with the accompanying drawings.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Last, it is to be appreciated that unless defined otherwise, all technical and scientific terms used herein have the same meaning as commonly understood by one of ordinary skill in the art to which this invention belongs.

Apparatus Overview

Figure 1A:
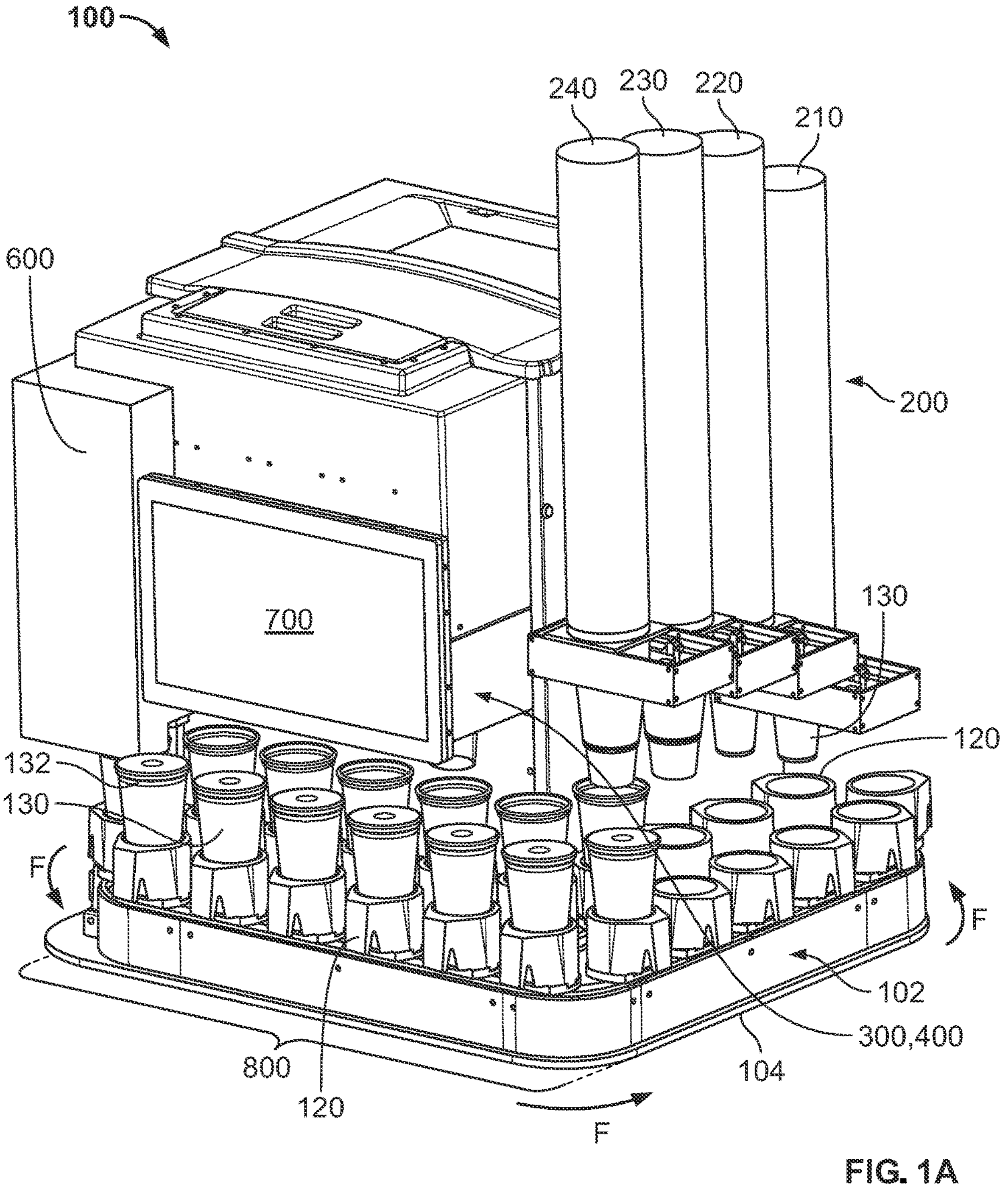
FIGS. 1A-1C illustrate a right-side top isometric view, a left-side top isometric view, and a front view, respectively, of an automated beverage dispensing system in accordance with an embodiment of the invention.

FIG. 1A shows an automated beverage dispensing system (ABDS) 100 in accordance with an embodiment of the invention. The ABDS 100 shown in FIG. 1A includes a plurality of cup holders 120 (some of which are shown holding cups 130). The cup holders 120 are advanceable (F) along a conveyor route, discussed herein.

Various functional stations are located along the conveyor route including a cup singulation station 200 for placing a particular-sized cup 130 into the cup holder 120, an ice dispensing station 300, a beverage dispensing station 400, a cup sealing station 600, an interactive touchscreen display 700 and a staging area 800 arranged below the display for presenting sealed beverage-filled cups 130 to the operators.

Figure 1B:
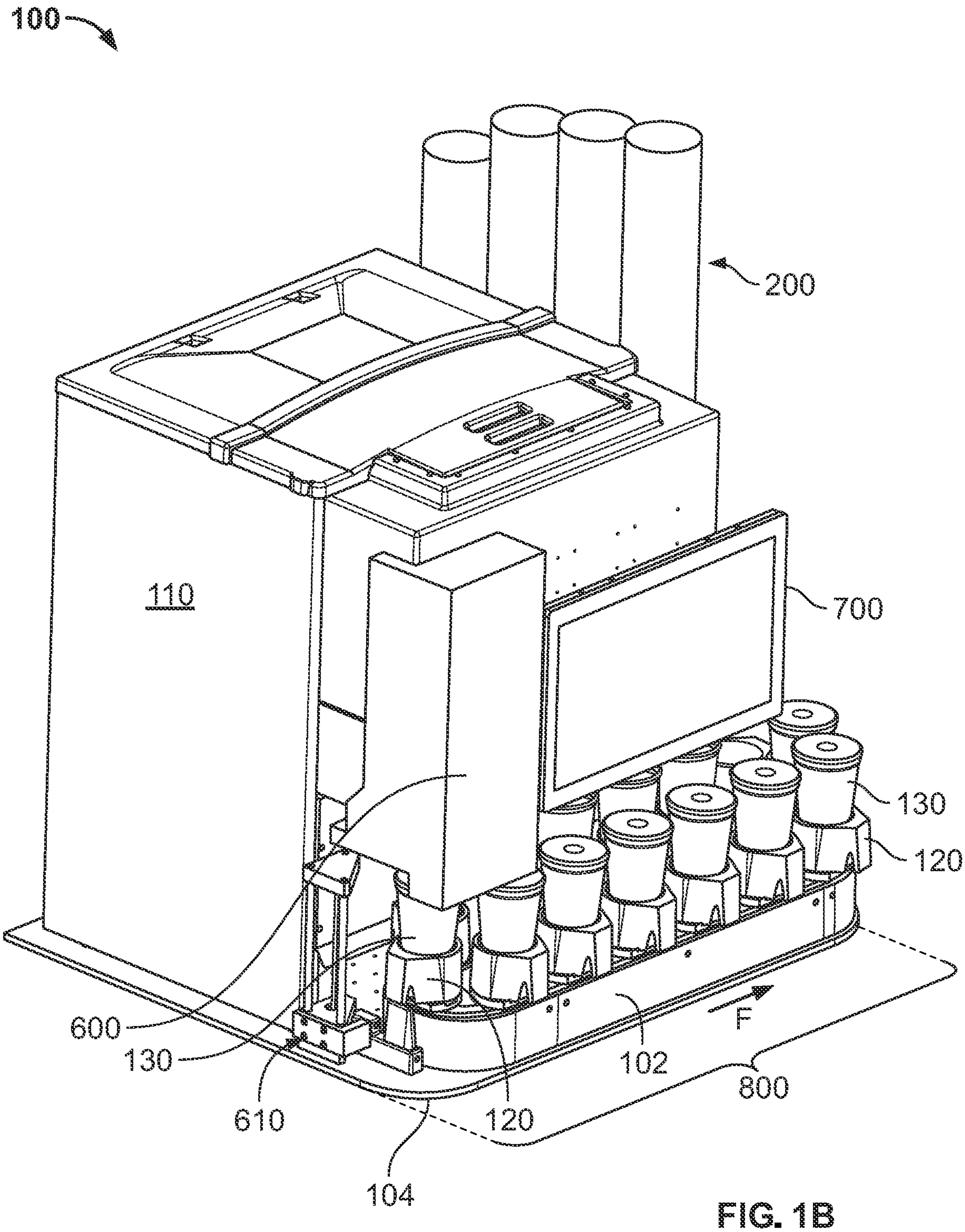
Figure 1C:
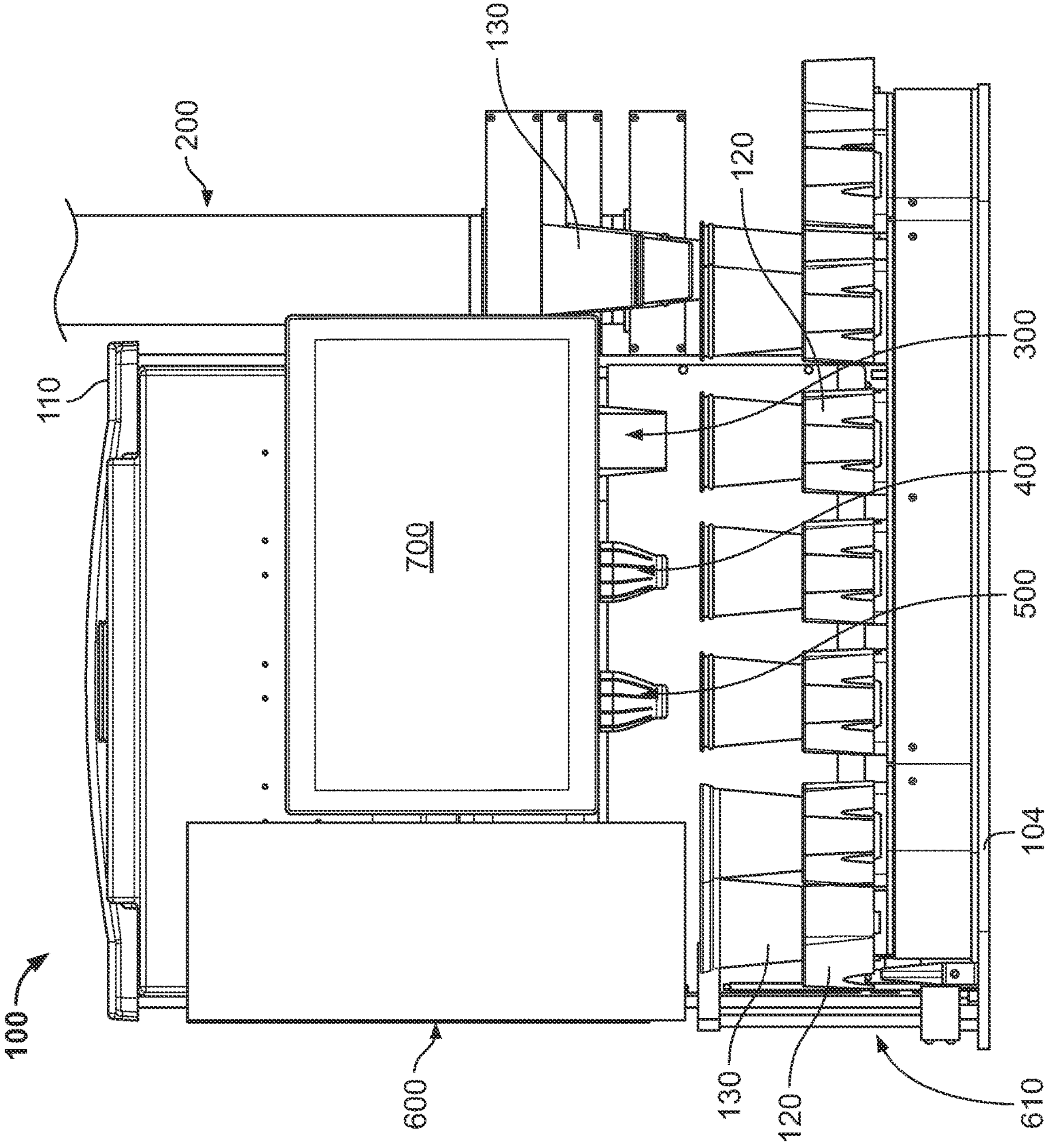

With reference to FIGS. 1B, 1C, a cup lifting assembly 610, described herein, serves to lift the cup holder 120 (and cup 130) into the cup sealing unit 600, where the top of the cup can be sealed (FIG. 1A shows a cup seal 132). Electronic, computer, heating, and mechanical components, discussed herein, are enclosed within a housing or enclosure 110 to control various aspects of the conveyor and stations.

The ABDS is also shown assembled or mounted on a rigid plate 104. However, in other embodiments, the components may be arranged together using a skeleton or open framework allowing spills to fall directly to the floor, thereby avoiding contaminating the conveyor assembly components.

Figure 1D:
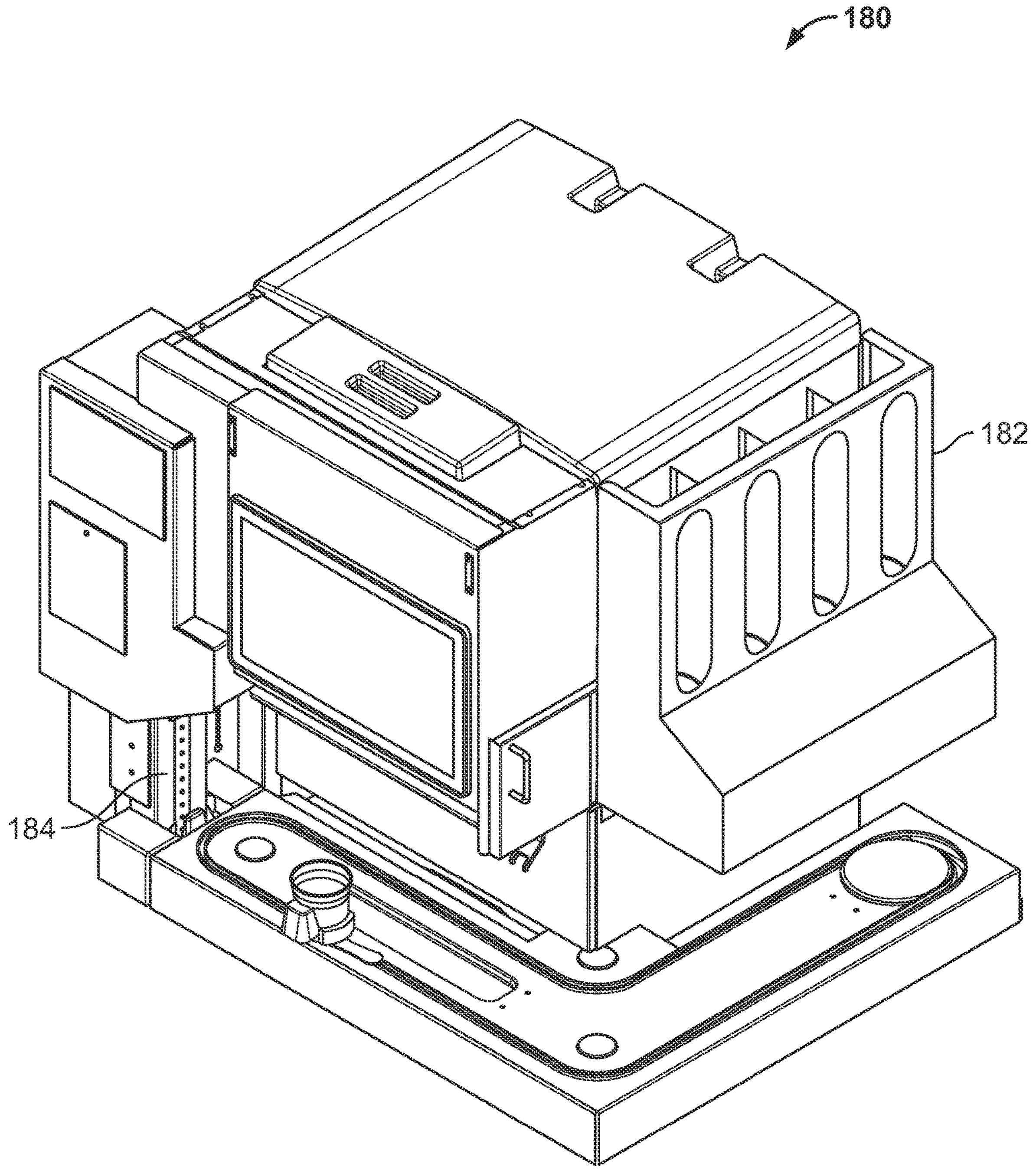
FIGS. 1D-1F illustrate a right-side top isometric view, a front view, and a right-side view, respectively, of an automated beverage dispensing system in accordance with an embodiment of the invention.
Figure 1E:
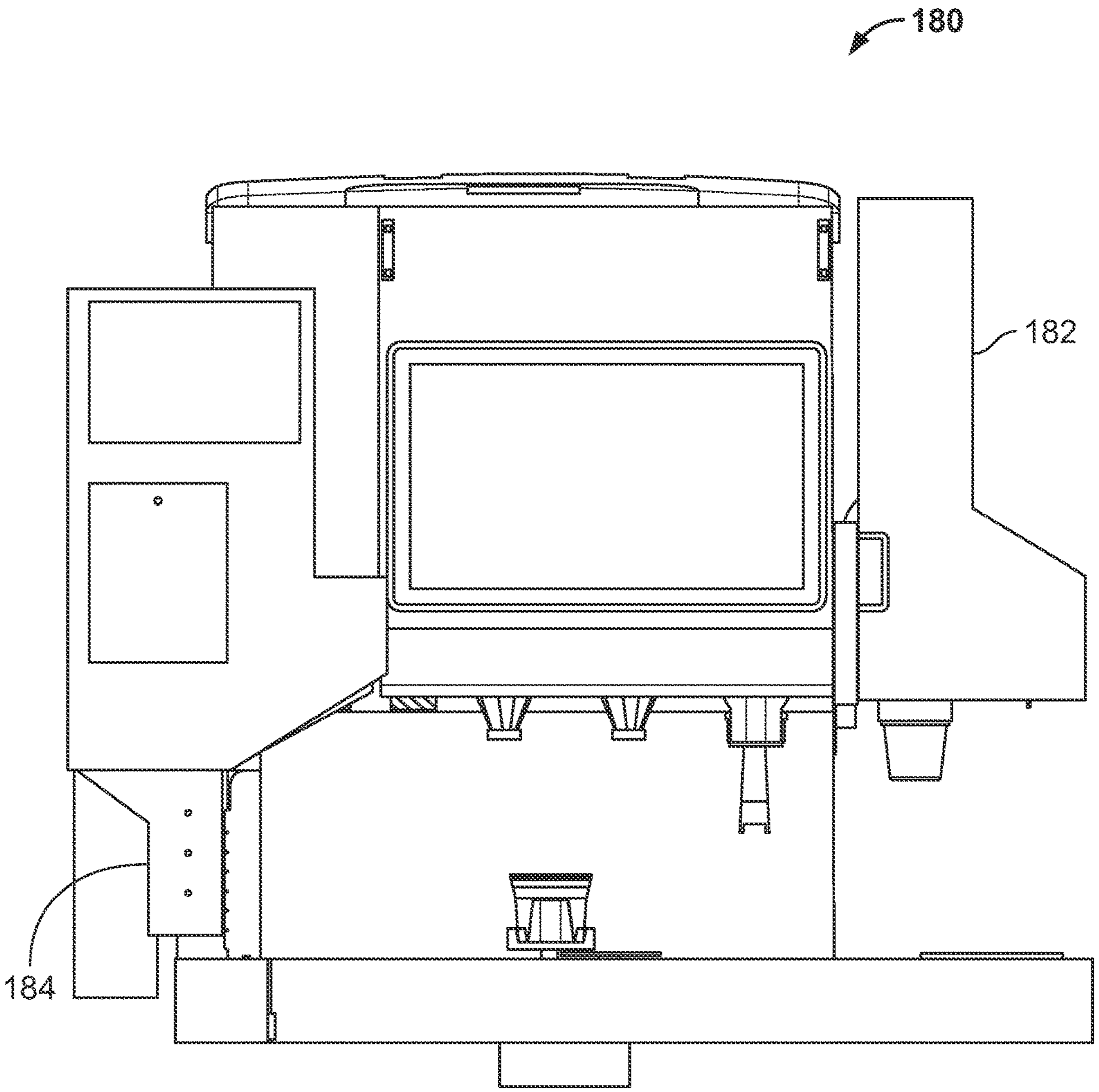
Figure 1F:
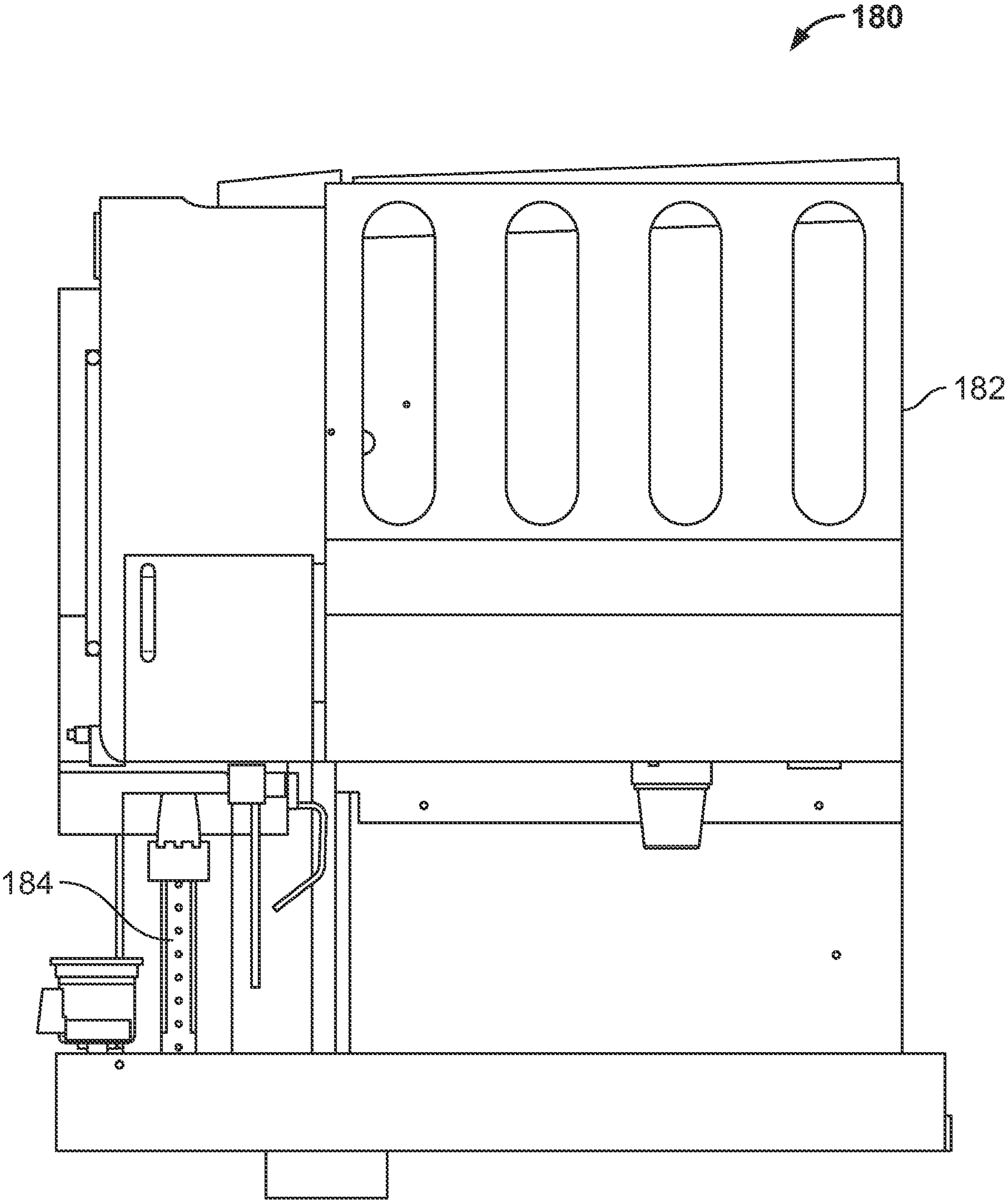

FIGS. 1D-1F illustrate various views of an automated beverage dispensing system 180 in accordance with another embodiment of the invention. The system 180 is generally similar to the system 100 described above in connection with FIGS. 1A-1C and includes the same types of stations. However, as will be described herein, some of the specific mechanisms for carrying out the function of the station can be different. For example, and as described further herein, the cup singulation station 182 and cup sealing station 184 comprise visibly different shapes than their counterparts shown in FIG. 1A-1C.

Figure 2:
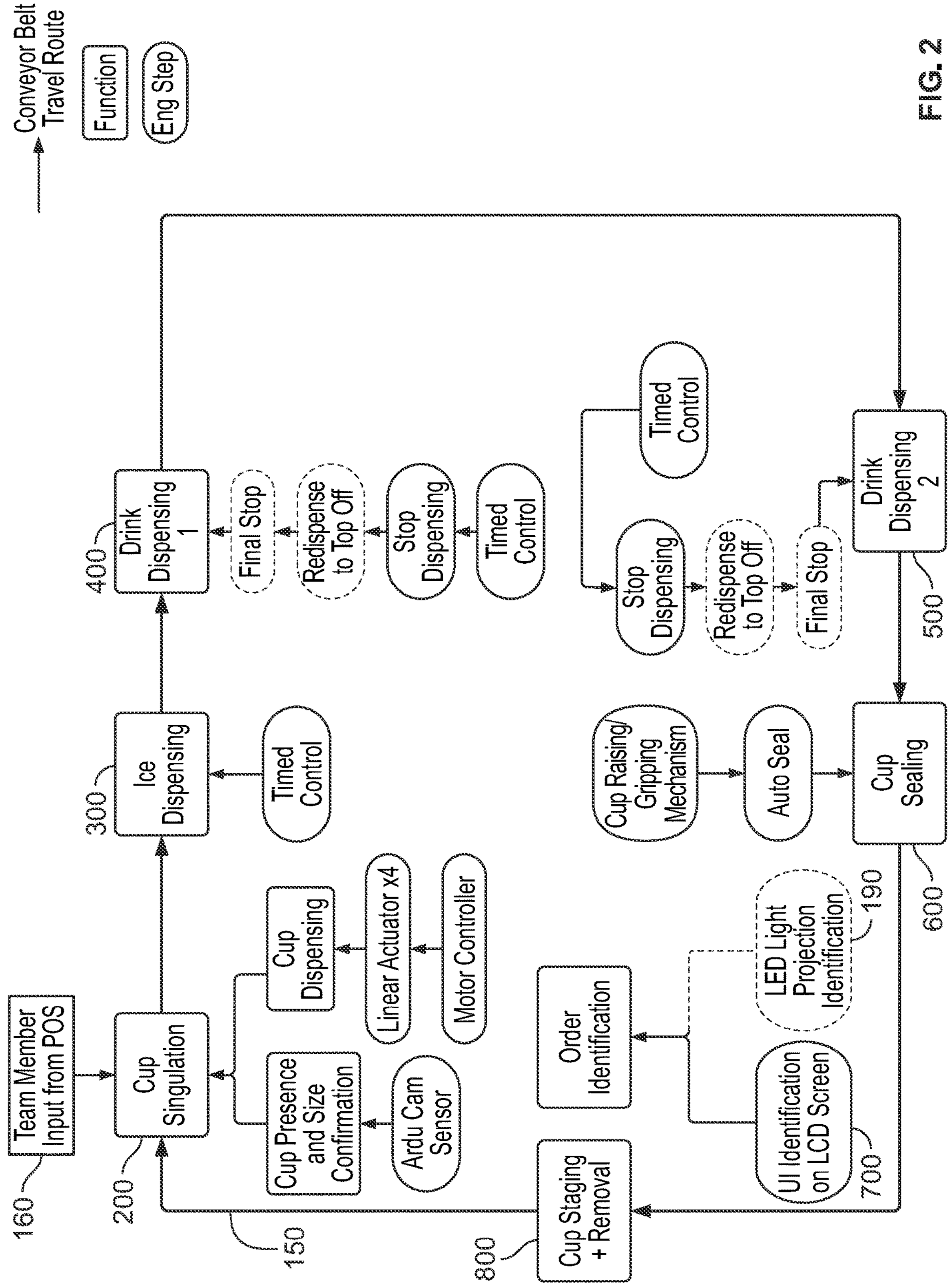
FIG. 2 is a functional overview diagram of an automated beverage dispensing system in accordance with an embodiment of the invention.

With reference to FIG. 2, a schematic overview of a conveyor travel route 150 is shown in accordance with an embodiment of the invention.

Initially, instruction/input 160 is received for a beverage order. For example, an operator may enter a beverage order via a point of sales (POS) system or the touchscreen 700, discussed above. However, in embodiments, a customer may enter an order via a customer kiosk or an App, using any appropriate technology, including, without limitation, a cloud-based server. An example of an order may include customer name, time, size, beverage type, and quantity.

Based on the order 160, cup singulation station 200 drops a specific-sized cup into a cup holder arranged on the conveyor assembly. One or more sensors, discussed herein, confirm the cup presence and size. If the cup is not present, cup singulation may be repeated. If the cup is the incorrect size, the position of the incorrect cup may be recorded, and the conveyor advances to the next position for placement of a correct-sized cup. The position along the conveyor of the incorrect cup size may be ignored or used in another order if the cup size and timing is acceptable.

Ice dispensing station 300 is the next station shown along the conveyor path 150. Ice dispensing station 300 can deliver a predetermined amount of ice into the cup based on the cup size. Various ice dispensing systems may be incorporated into the ABDS, discussed further herein.

First drink dispensing station 400 is the next station shown along conveyor path 150. Drink dispensing station can deliver a predetermined amount of beverage into the cup based on the cup size. Various drink dispensing systems may be incorporated into the ABDS, discussed further herein. Optionally, the drink dispensing station may be operable to compute and provide a top off amount, discussed further herein.

In the embodiment shown in FIG. 2, a second drink dispensing station 500 is located along the conveyor route. The second drink dispensing station may operate similar to the first drink dispensing station. A second drink dispensing station can increase throughput by pouring drinks in parallel because the beverage pouring step is often the longest step in the process. In embodiments of the invention, additional drink dispensing stations may be arranged along the conveyor.

Cup sealing station 600 is the next station shown along conveyor path 150. Cup sealing station can seal the cup with a thin liquid tight film, discussed further herein. Alternatively, lidding units may be incorporated into the ABDS to place a lid on the cup.

Cup staging station 800 is the next station shown along conveyor path 150. Cup staging station physically presents the completed drink for pickup and correlates attributes (e.g., name, order number, drink size, drink type, time, part x of y, etc.) of the presented drink by the touchscreen display 700, or by a programmable onboard illumination panel 190, discussed herein.

After the cup 130 is picked up by the worker the empty cup holder 120 is advanced to the singulation station 200 to receive a new cup for a new order. The process can be repeated as requested.

Figure 3:
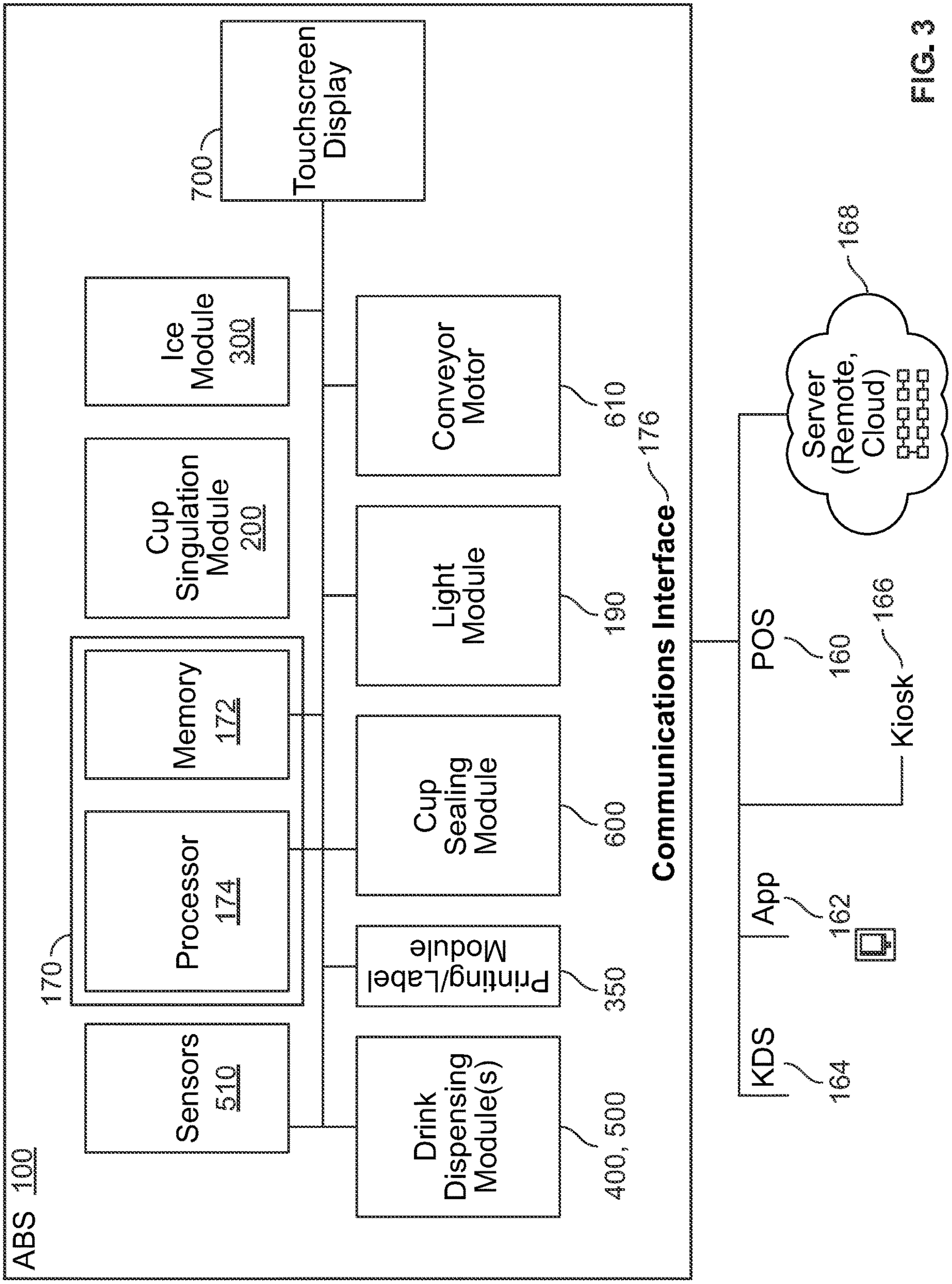
FIG. 3 is a block diagram of an automated beverage dispensing system in accordance with an embodiment of the invention.

With reference to FIG. 3, each of the stations 200, 300, 400, 500, 600, sensors 510, and the other components may be in communication with a computing system 170. The computing device 170 may be a conventional micro-computer and the like including, for example, a processor 174, memory 172, and communication interface 176. However, the computing device may vary widely and include additional processors, types of memory, ports, communication interfaces (e.g., Wi-Fi, Bluetooth, ethernet, etc.), power supplies, and other components. The computing device 170 may be internal to or remote from the ABDS 100. The computing device 170 may be responsive to instructions or requests from a number of input devices. Examples of input devices include, without limitation, point of sale (POS) systems 160, tablets and smart phone 162, kitchen display systems (KDS) 164, customer kiosks 166, and onboard touch screens 700. Instructions or requests may be entered by an operator, team member, customer, or another as the case may be.

FIG. 3 also shows server 168 which may be remote or a cloud-based. Such remote servers 168 may be used to generally communicate with the ABDS, receive and store data, upload program updates, and host an associated website. Local input devices (e.g., without limitation, tablets, smart phones, desktop or workstations) may download a program or App to conveniently communicate with the website to place orders and monitor activity. Also, local input devices may directly communicate with the ABDS via wired or wireless communications.

Figure 4:
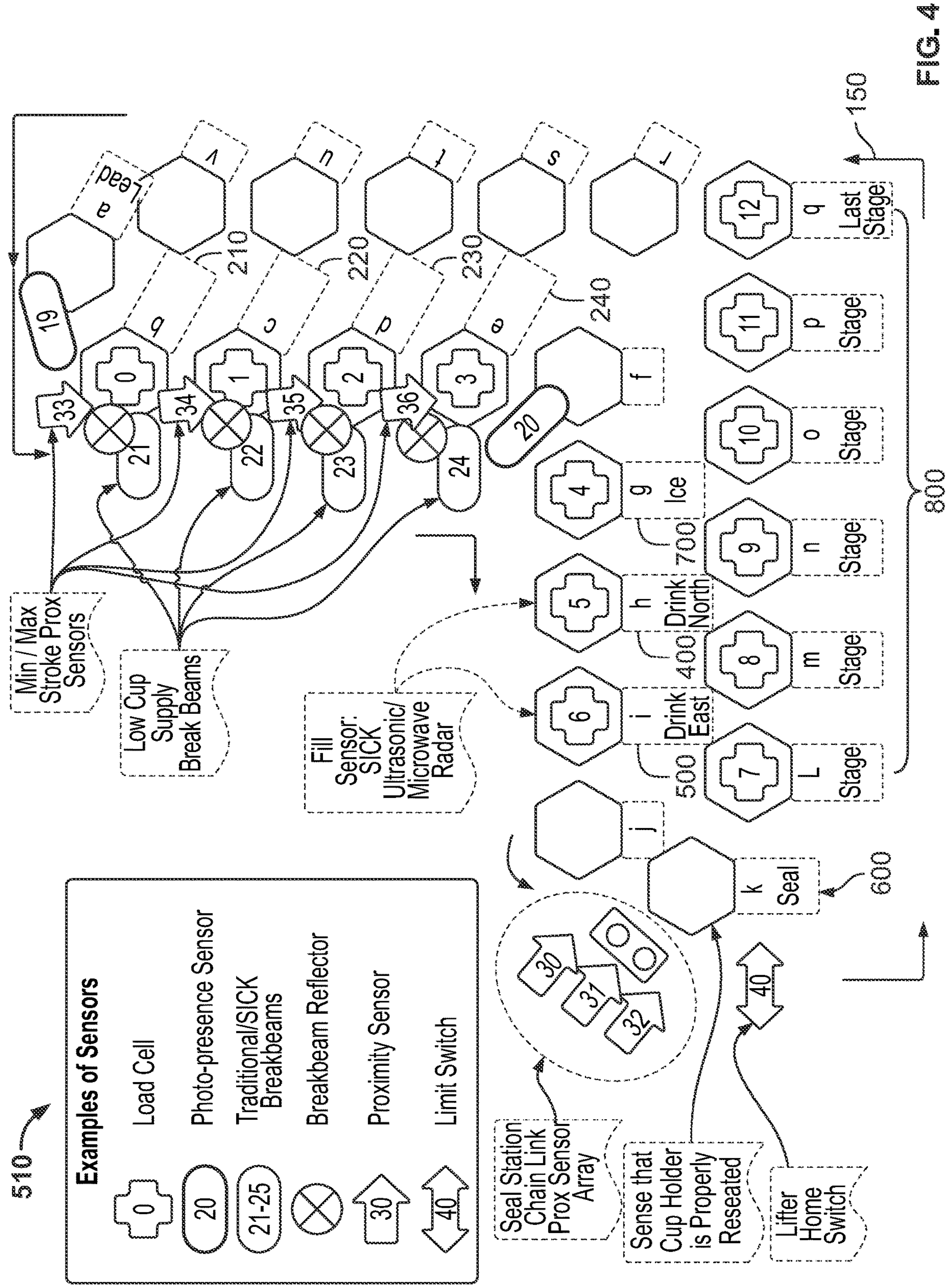
FIG. 4 is a sensor diagram of an automated beverage dispensing system in accordance with an embodiment of the invention.

FIG. 4 is a sensor diagram illustrating the location and type of sensor along the conveyor route 150 in accordance with an embodiment of the invention. In FIG. 4, each location along the conveyor route is labelled "a", "b", "c", "v".

Location "a" corresponds to the lead or first location along the conveyor route and prior to the cup singulation station, described above. A photo-presence sensor 19 monitors for whether a cup is present in the cup holder. Should a cup be present, the system will record to ignore (and for removal in the staging area). Should the sensor indicate an empty cup holder (i.e., no cup detected), the system updates location "a" as ready for order. An example of a suitable photo-presence sensor is model WL15-A2430, manufactured by SICK AG, (Waldkirch, Germany).

Locations "b"-"e" correspond to the small 210, medium 220, large 230, and x-large 240 cup towers, respectively, in the cup placing station described herein. Each cup placing location "b"-"e" is shown monitored by a load cell 0, 1, 2, 3 (for weight). Based on the detected weight, the system can compute whether a cup is present, and the size of the cup. An example of a suitable load cell is model LCEB, manufactured by Omega Engineering Inc. (Norwalk, CT).

Each of locations "b"-"e" also are shown being monitored by a break beam sensor/reflector 21-24. The break beam sensor can monitor each cup tower for supply thresholds, described further herein. An example of a suitable break beam sensor and reflector is model O6S202-O6S-OOKG/AS/3P, manufactured by ifm Efector, Inc. (Malvern, PA 19355).

Each of locations "b"-"e" also are shown being monitored by a proximity sensor 33-36. The proximity sensor(s) can monitor the singulation assembly for actuation position, discussed further herein. An example of a suitable proximity sensor is model DW-AD-504-M5, manufactured by Contrinex Gmbh. (Corminboeuf, Switzerland).

Location "f" is monitored by a photo-presence sensor 20.

Locations "g", "h", "i", corresponding to the ice and drink dispensing stations 300, 400, 500, are shown being monitored by load cells 4-6. Optionally, an additional sensor may be employed at "h", "i" to detect fill. In addition to a break beam sensor described herein, an ultrasonic or microwave radar type sensor may be employed to detect level of liquid fill.

Location "j" is shown without a sensor. However, in embodiments, it is monitored by a photo-presence or other type of sensor.

Location "k", corresponding to the sealing station 600, is shown being monitored by a proximity sensor array (proximity sensors 30, 31, 32) to monitor proximity of the cup holder to a sealing station lift assembly, discussed further herein.

Location "k" also shows a limit switch 40 for sensing when the lifting assembly is at a home position, and wherein the system can be programmed to prohibit conveyor motion when the limit switch 40 is not in the home position. An example of a suitable limit switch is model XVM3SBQF1802L03, manufactured by CIT Relay and Switch (Rogers, M N).

Locations "L"-"q", corresponding to the staging area 800, are shown being monitored by load cells 7-12, where location "q" is the last stage.

The conveyor route 150 continues through locations "r"-"v", after which the path repeats itself commencing with location "a", described above. Locations "r"-"v" are shown without any sensors. However, embodiments of the invention may monitor each of these locations with one or more sensors, as well as add additional stations, or other components except as where limited in any appended claims. For example, and without limitation, one or more of the locations "r"-"v" may be used as additional staging stations.

Conveyor Assembly Detail

Figure 5A:
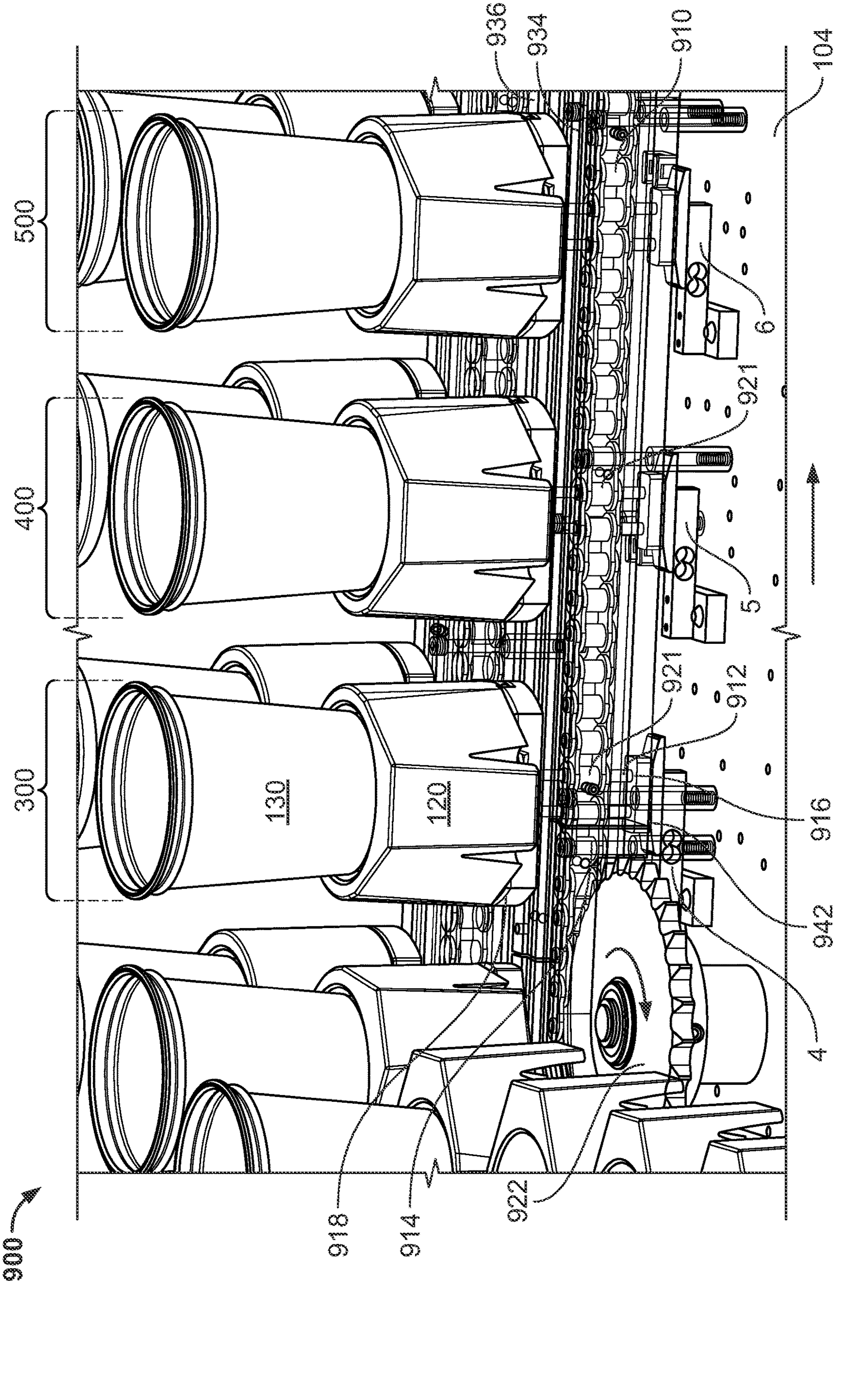
FIG. 5A is an enlarged view of a conveyor assembly and various stations along the conveyor path in accordance with embodiments of the invention.

FIG. 5A shows an enlarged partial view of the conveyor assembly 900 in the vicinity of the ice dispensing station 300 and liquid dispensing stations 400, 500 in accordance with an embodiment of the invention. The conveyor assembly 900 includes a conveyor chain 910, gear 922, and parallel rails 934, 936 coupled to deck 104.

Chain 910 includes openings in each of its pins 921 through which rods (e.g., rods 912, 914) can extend therethrough. Each set of rods is shown extending from a base 916, through pins 921, between guide rails 934, 936, and into the bottom of a cup substrate 918. The rods cooperate with openings in the pins 921 to allow the entire cup assembly to be vertically elevated when the base 916 is elevated. Conversely, when the base is lowered, the entire cup assembly lowers until the cup substrate 918 contacts parallel upper track rails 934, 936.

As the gears and chain are driven by a conveyor motor (not shown), the chain 910 and sets of rods are moved along the conveyor route. Consequently, each cup substrate 918, cup holder 120 and, if present, cup 130 are moved along the conveyor route from station to station.

FIG. 5A also shows load sensors 4, 5, 6, arranged below the conveyor assembly. The locations of the load sensors 4, 5, 6 correspond respectively to the ice dispensing station 300, the first drink dispensing station 400, and the second drink station 500.

The load sensor 4 corresponding to the ice dispensing station 300 is shown fixedly arranged below a base member 916 of a cup assembly. A ramp 942 is provided to controllably elevate the base and, thus, the entire cup assembly from the rails 934, 936 in order to measure the mass of the cup assembly, the cup, and its contents.

The load sensors 5, 6, corresponding to the beverage dispensing stations 400, 500, operate similar to the load sensor 4 in order to measure mass of the cup assembly, cup, and contents of the cup.

Figure 5B:
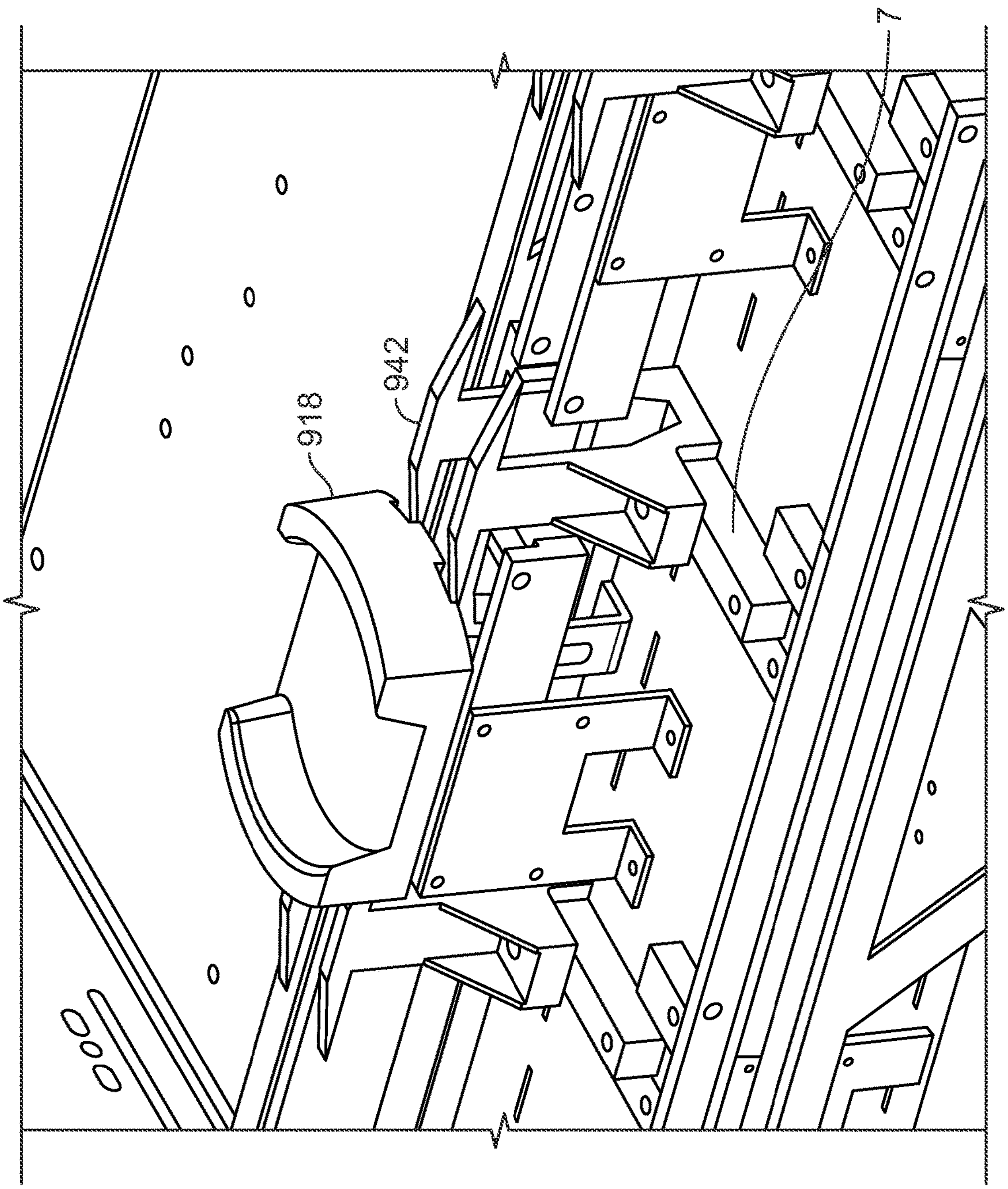
FIG. 5B is an enlarged partial view of a weighing assembly located along the conveyor path in accordance with another embodiment of the invention.

FIG. 5B shows a load sensor 7 arranged below a conveyor assembly in accordance with another embodiment of the invention. In the embodiment shown in FIG. 5B, unlike that shown in FIG. 5A, the ramp 942 is arranged above the conveyor.

Figure 5C:
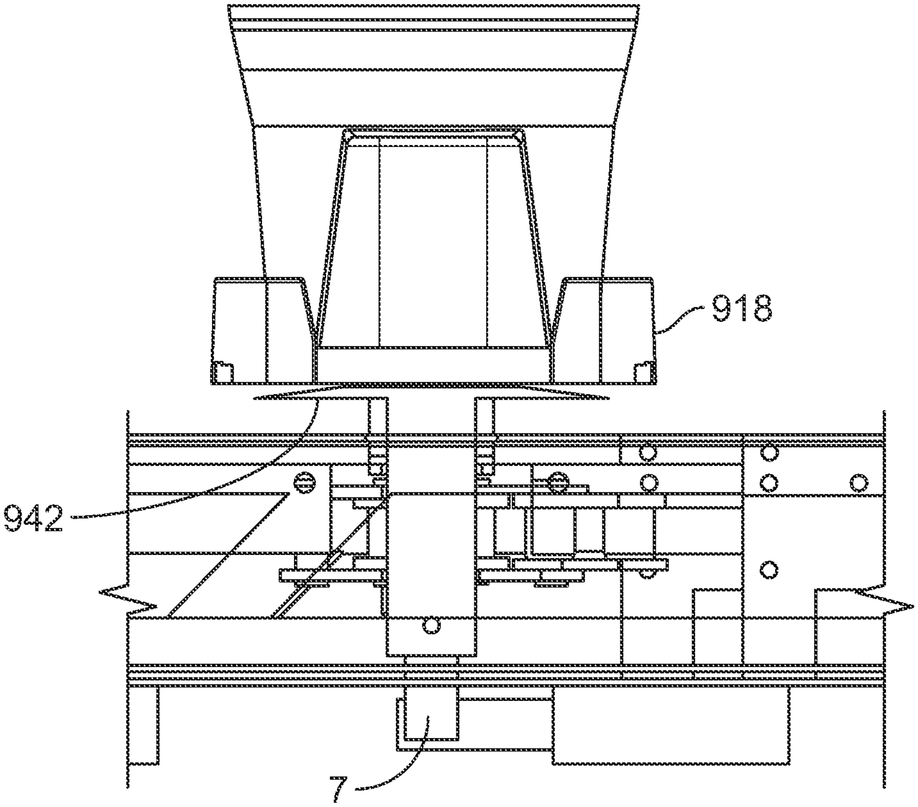
FIGS. 5C-5D are enlarged views illustrating, in sequence, a cup assembly moving across the weighing assembly shown in FIG. 5B.

With reference to FIG. 5C, it can be seen that the ramp 942 contacts the substrate 918 directly, to elevate it above the conveyor. Direct contact tends to minimize frictional jams. The fewer moving parts to elevate, the less likely a jam shall occur.

Figure 5D:
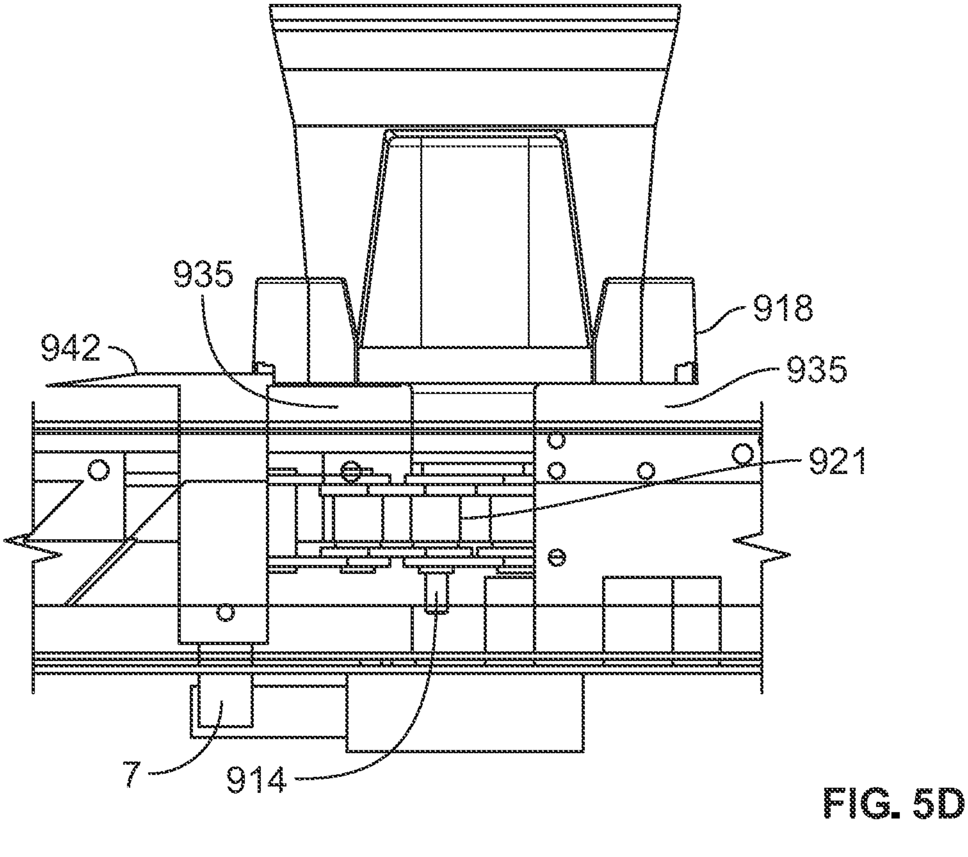

FIG. 5D shows the substrate 918 being lowered from the ramp 942 onto rails 935. Rod 914 continues to remain registered in hollow pin 921 so that movement of the chain 910 controls movement of the cup assembly over the load sensor 7 and onto the next station as the case may be.

Figure 6A:
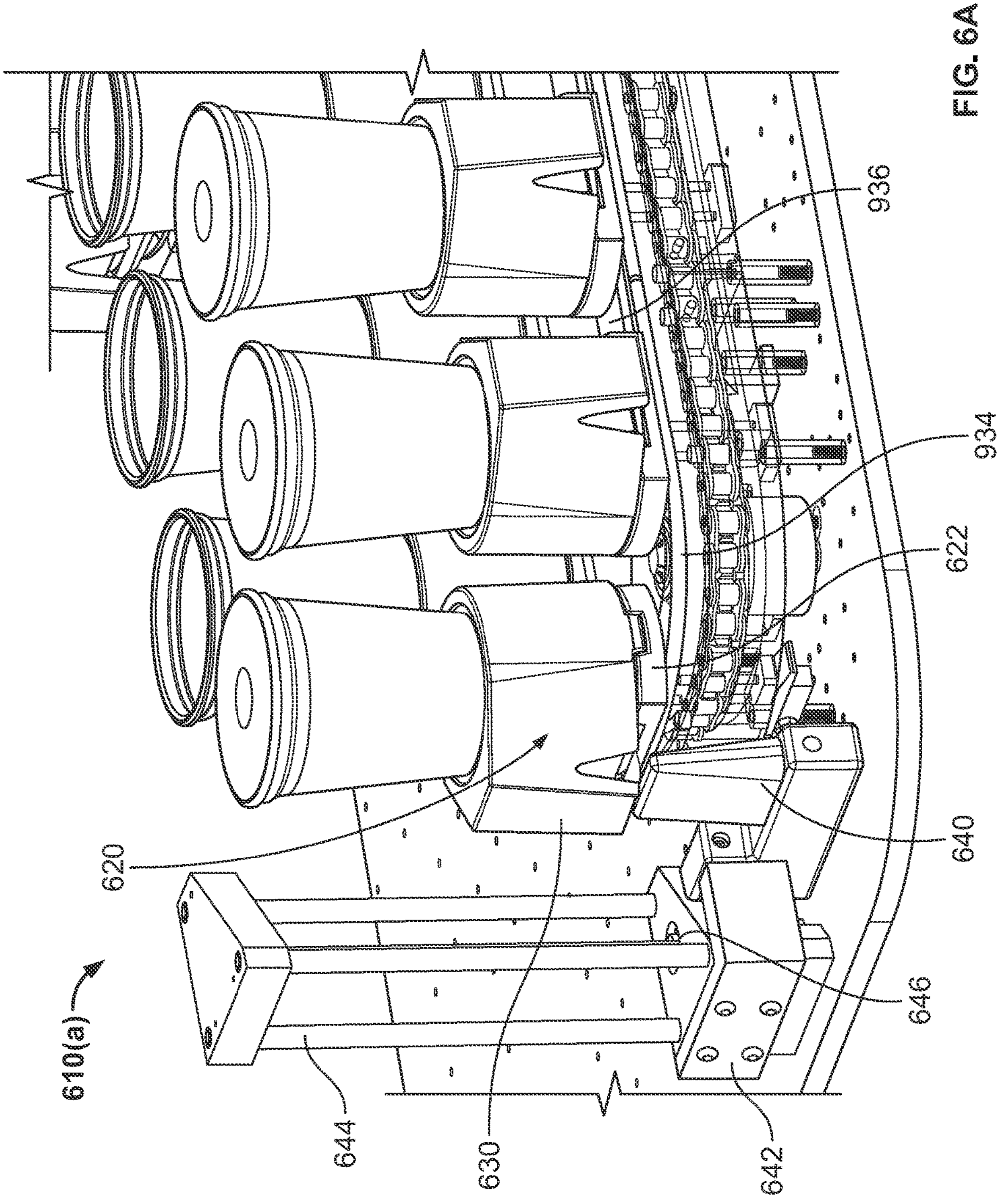
FIGS. 6A-6C are enlarged views of a conveyor assembly sequentially illustrating lifting a cup in accordance with an embodiment of the invention.
Figure 6B:
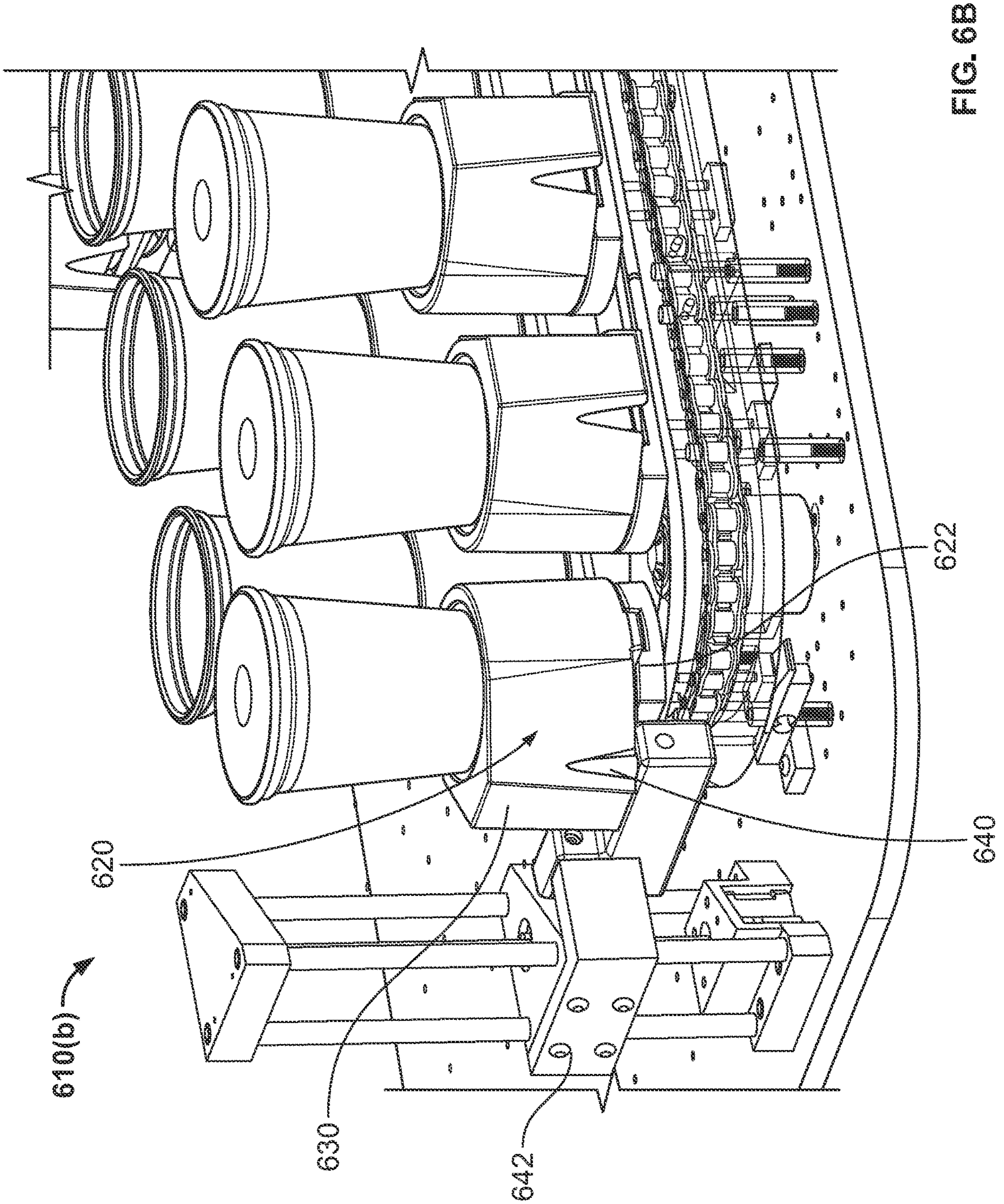
Figure 6C:
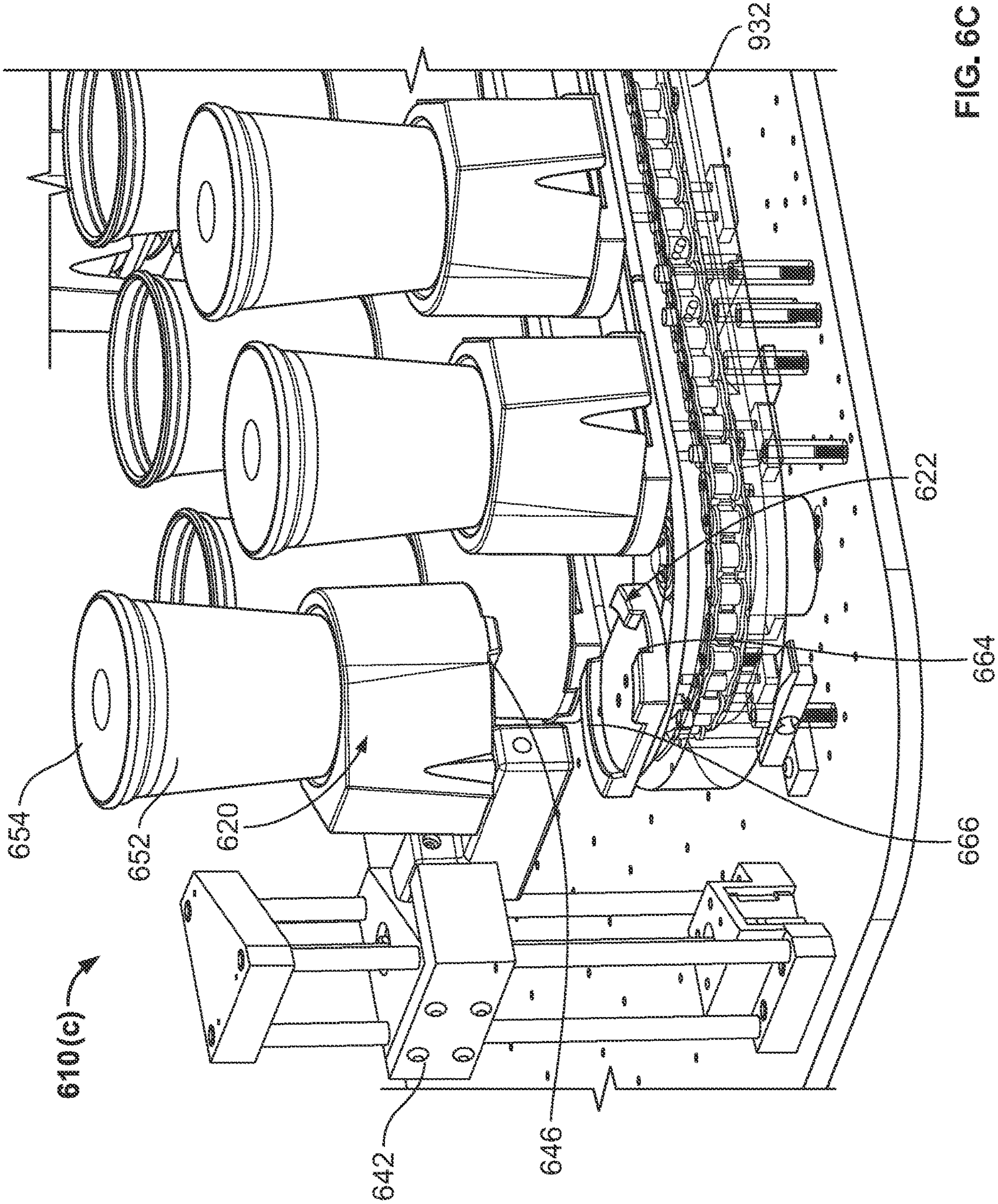

FIGS. 6A-6C show enlarged partial views of the conveyor assembly at the sealing station location. Particularly, FIGS. 6A-6C show a lift assembly in a down or home configuration 610*a*, mid-point configuration 610*b*, and elevated configuration 610*c*, respectively.

In the down or home configuration 610(*a*) shown in FIG. 6A, cup holder 620 is removably located on cup substrate 622. Features (e.g., tabs) on the bottom surface of the cup holder removably engage with indents on the top surface of the substrate 622. The features are arranged to allow lift and placement of the cup holder on the cup substrate but prohibit lateral motion.

Capture arm 630 defines an internal cavity to receive insert 640. The internal cavity and insert 640 are adapted to slidably engage with one another.

Insert 640 is shown fixedly coupled to carriage 642. Carriage 642 is linearly moveable up and down along guides 644 via a linear actuator 646 (e.g., a stepper motor driven lead screw actuator). Examples of types of linear actuators include linear motors and pneumatic-based designs.

FIG. 6B shows the lift assembly 610(*b*) and cup holder in the mid-point configuration. The carriage 642 is partially elevated, and the insert 640 is engaged with the internal cavity defined by the capture arm 630. However, the cup holder 620 is still shown on the substrate 622.

FIG. 6C shows the lift assembly 610(*c*) and cup holder in the elevated configuration. The carriage 642 is elevated such that the cup holder 620 is elevated from the cup substrate 622 until the top of the cup 652 is inserted into a sealing unit (not shown). A thin film 654 is applied across the top of the cup 652, described further herein.

After the cup 652 is sealed, the carriage 642 returns to the down position thereby placing the cup holder 620 on the substrate 622 in which tabs 646 of the cup holder reengage with the detents 664 on the cup substrate. The cup substrate may also include one or more guides 666 to locate the cup holder as it is placed onto the substrate.

Figure 7:
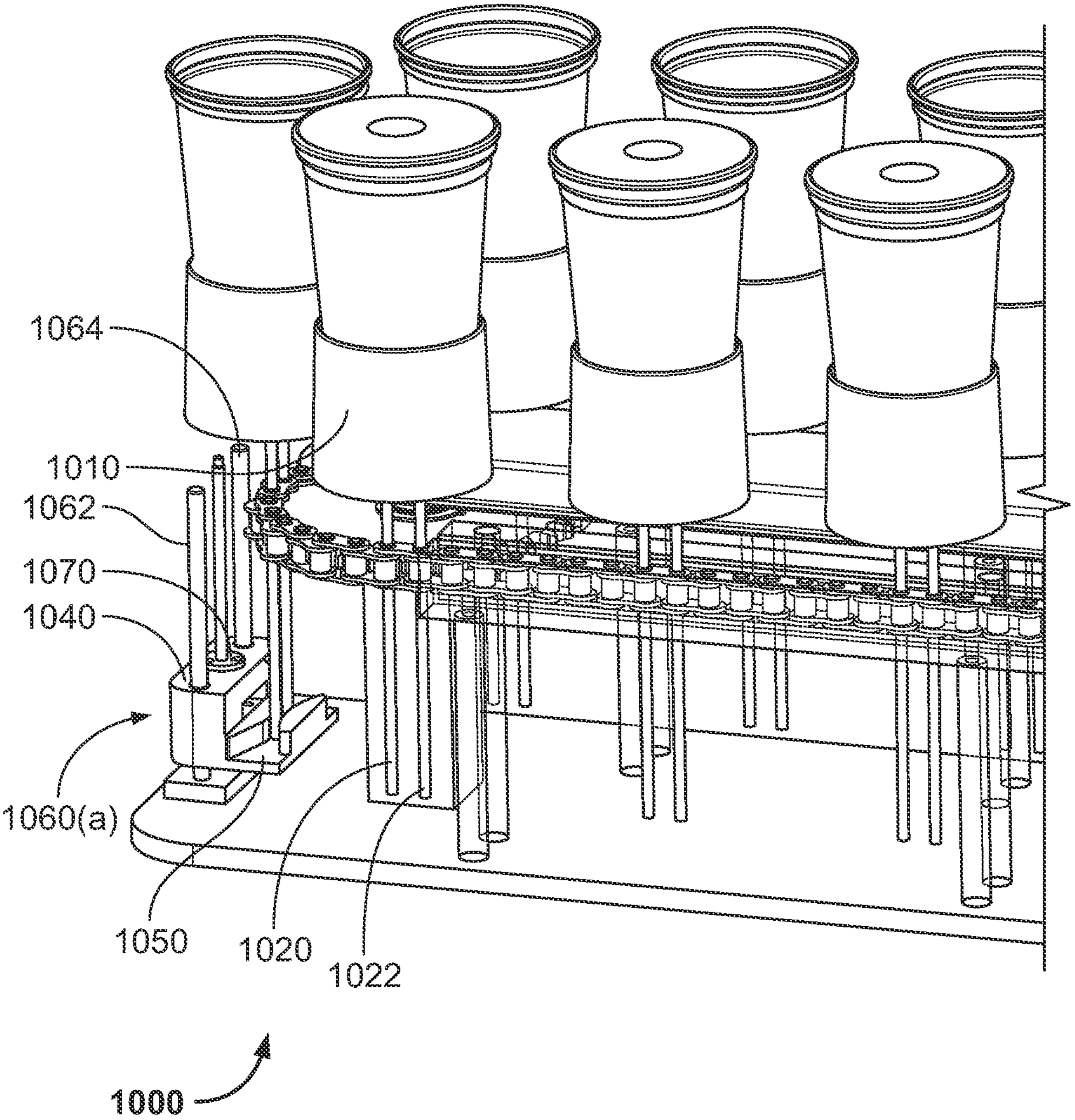
FIGS. 7-8 are enlarged views of a conveyor assembly sequentially illustrating lifting a cup in accordance with another embodiment of the invention.
Figure 8:
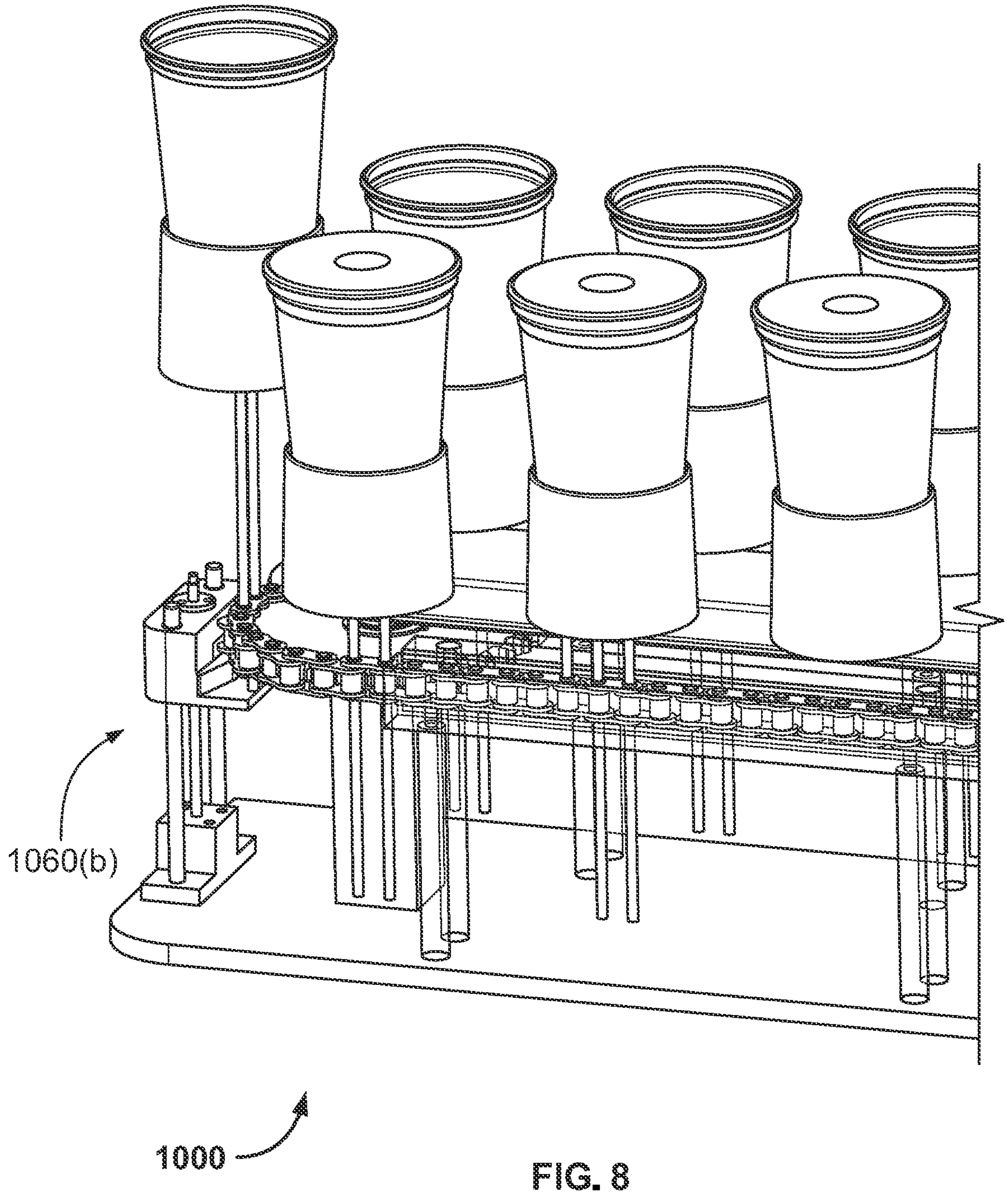

FIGS. 7-8 show another conveyor lift assembly 1000 in a lowered or home position 1060(*a*) and an elevated position 1060(*b*), respectively. The conveyor lift assembly 1000 can be arranged along the conveyor route to raise the cup into a station such as, e.g., the sealing unit 600.

Although many of the components in the embodiment shown in FIGS. 7-8 are similar to the components shown and described above in connection with other embodiments of the invention, a number of structures are different. For example, and with reference again to FIG. 7, the cup holder 1010 is directly coupled to rods 1020, 1022—there is not a separate detachable cup substrate as described above in connection with the embodiment shown in FIG. 5. When the rods 1020, 1022 are lifted, the cup holder 1010 is lifted.

Lift assembly 1060(*a*) is shown having a carriage 1040 that moves along guides 1062, 1064. An actuator 1070 such as a linear motor or pneumatic motor urges the carriage up or down along the guides.

A channel or slot 1050 captures the lower ends of the rods 1020, 1022 as the rod set approaches the lift location along the conveyor route. The slot in FIG. 7 is shown defined by a pair of walls that taper from an enlarged channel to a narrow channel.

Once the rod set and cup assembly are properly located and detected by the sensors, as described herein, the system elevates the cup assembly from the down/home position of 1060(*a*) to the elevated position 1060(*b*) shown in FIG. 8. After the cup is sealed or lidded or otherwise operated upon, the lift assembly returns to home position, and the conveyor may advance each cup holder to the next location along the conveyor route.

Cup Grabber

Figure 9:
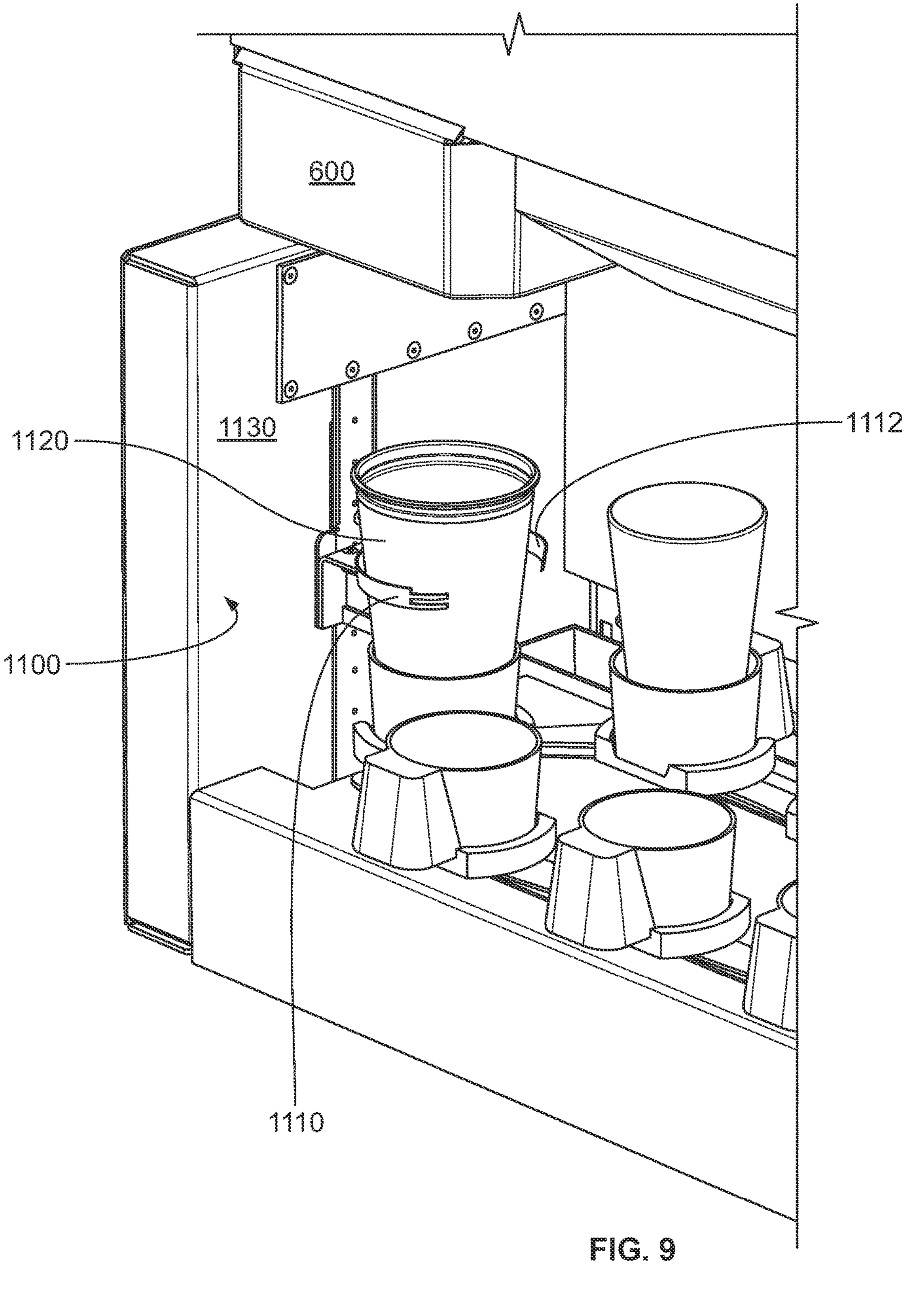
FIGS. 9-10 show an enlarged view of a cup lifting assembly for elevating the cup in accordance with another embodiment of the invention in an open and closed configuration, respectively.
Figure 10:
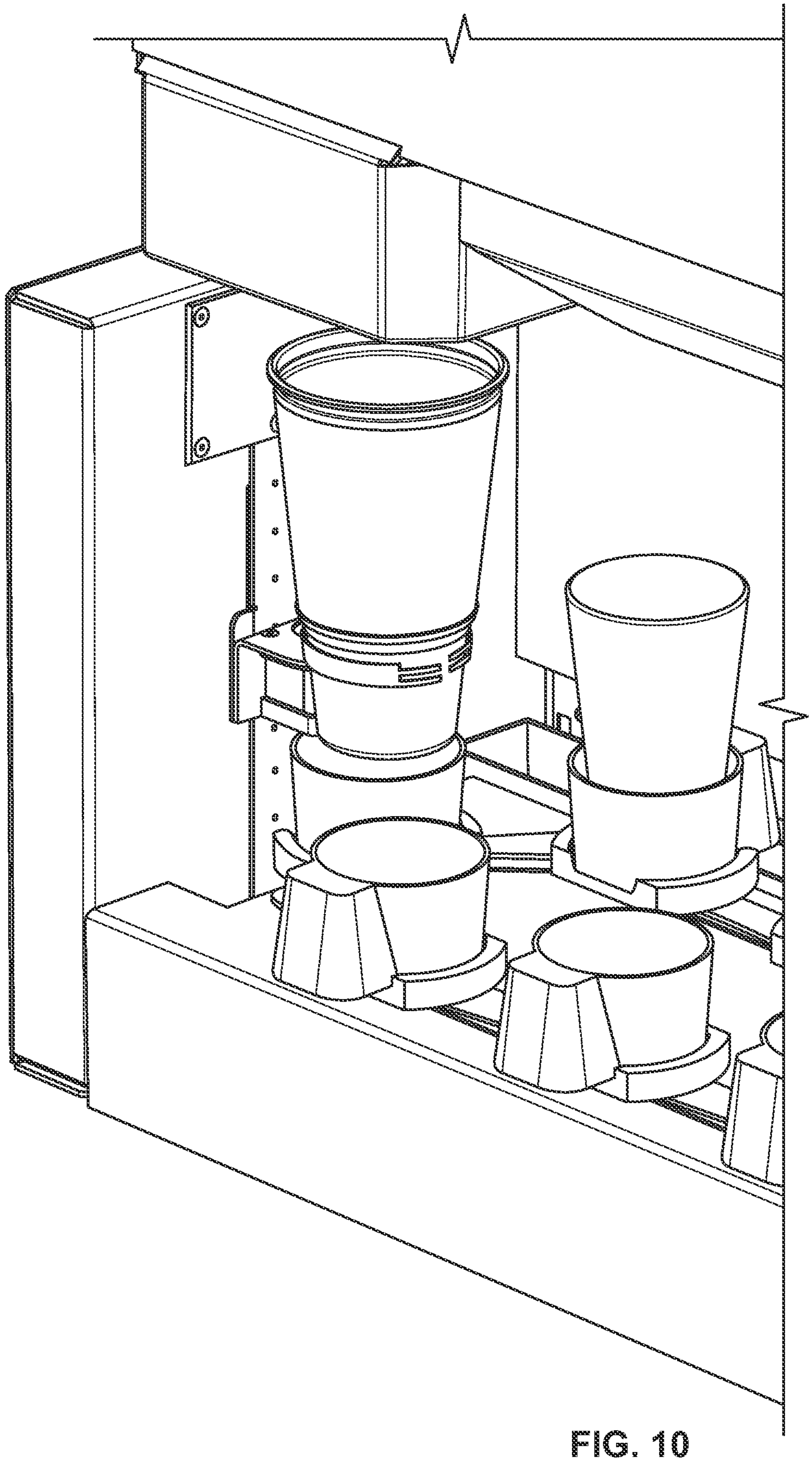

FIGS. 9-10 show a lift assembly 1100 in accordance with another embodiment of the invention for lifting the cup. The lift assembly 1100 is arranged along the conveyor route to raise the cup 1120 into sealing unit 600. The lift assembly 1100 is shown including opposing arms 1110, 1112 operable to grab the cup 1120 from an open position as shown in FIG. 9 to a closed position as shown in FIG. 10. The arms 1110, 1112 are operable to open and close on the cup to varying degrees so as to accommodate cups of different size. In embodiments, the arms are linked to an actuator to open and close. The cup grabber can be raised by a lead screw/bushing design (e.g., acme screw and bushing design) optionally contained within housing 1130.

Optionally, and as shown in sealing station 184 in FIGS. 1D-1F, the cup elevator may be driven by a linear motor and rail/guide design (e.g., single rail design). In view of some of the above variations of the invention, it is to be understood that a wide range of mechanisms, motors and components for positioning the cup and sealing unit in operable engagement are intended to be included in the subject invention.

Cup Placement Station

With reference again to FIGS. 1*a*-1*f*, cup singulation station 182, 200 can include a plurality of cup singulation units or towers (e.g., 210, 220, 230, 240) for holding and ejecting different sized cups onto the conveyer. The cup singulation units are shown in a linear configuration. The cup singulation units can be fixed relative to the conveyor and each cup tower has a dedicated cup drop location, namely, position ‘c’, ‘d’, or ‘e’ of FIG. 4. However, the invention is not intended to be so limited except where recited in any appended claims. In other embodiments, for example, the singulation units or cup towers can be arranged in a circular configuration, and optionally on top of a rotating disk or plate to controllably align each of the different cup singulation units with a single target location on the conveyor.

Figure 11A:
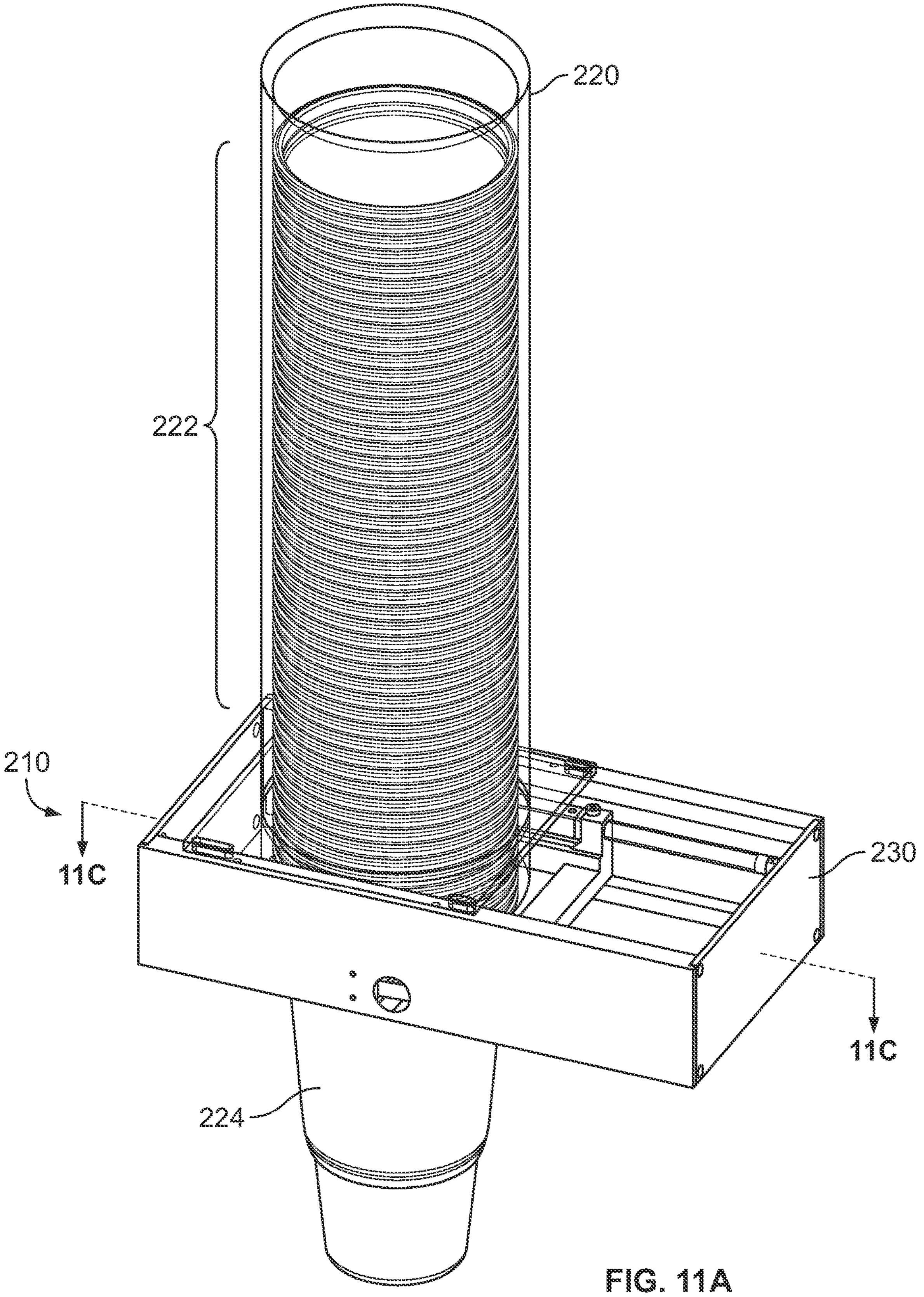
FIGS. 11A-11D are enlarged views of a singulation unit in accordance with another embodiment of the invention.

FIG. 11A is an enlarged view of an exemplary singulation unit (e.g., small cup singulation unit 210 shown in FIG. 1A) in accordance with an embodiment of the invention. The cup singulation unit 210 is shown having a vertically arranged cup storage tower 220 in which a stack of cups 222 is stored. A cup-separating device 230 is located at the bottom of the tower 220 for controllably separating one cup from the stack 222. Not shown, the separated cup falls into a cup holder on the conveyor immediately below the cup tower.

Figure 11B:
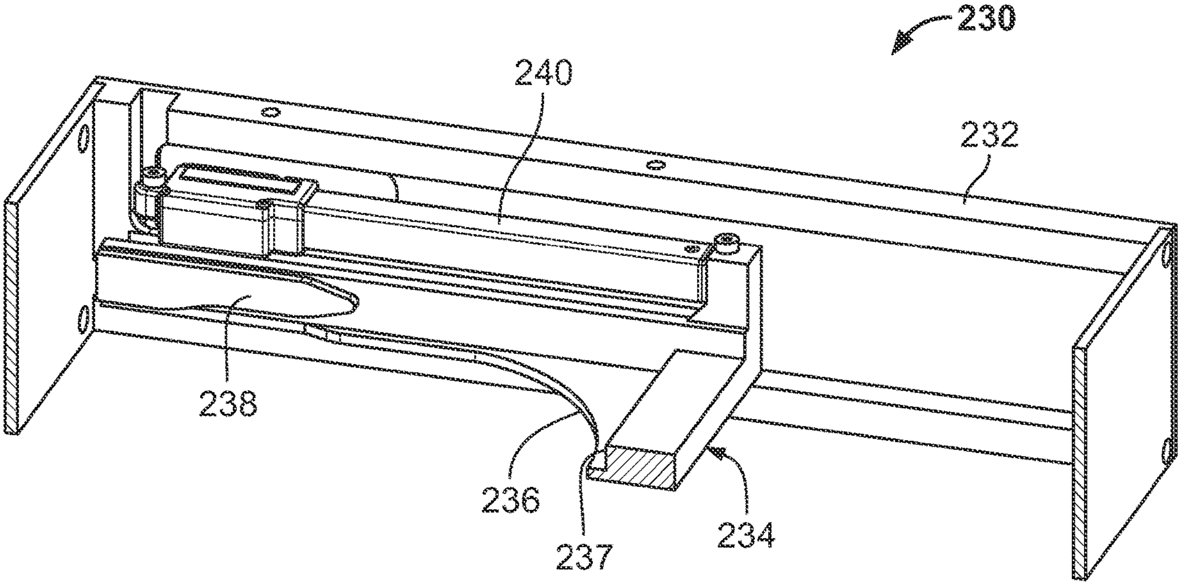

FIG. 11B shows an enlarged cross sectional view of the cup-separating device 230 in a home position. The illustrated side of the cup-separating device 230 includes frame 232, a fork 234, an actuator 240 to linearly move the fork from the home position 230 to the extended position 230' shown in FIG. 11D, and a splitter 238.

A first end of the fork 234 is shown with a curved profile 236 and stop 237. It should be understood that only one half of the fork is shown. In the embodiment shown, the fork is symmetrical and the features of the fork described in FIG. 11B are also present on the opposite side of the fork.

Figure 11C:
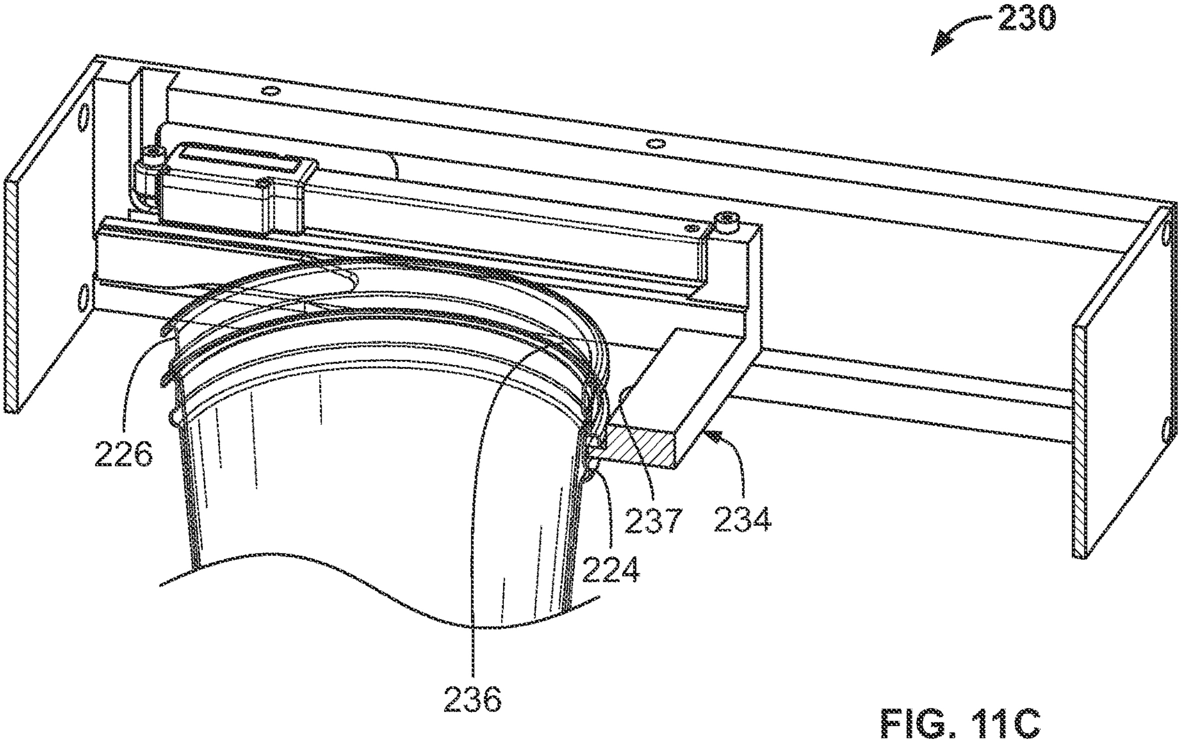

FIG. 11C shows cup-separating device 230 including cups 224, 226 in the home position. The curved profile 236 can be seen engaging the body of cup 224 just below its lip, while stop 237 is shown contacting the lip of the lower cup 224 in the home position.

To singulate the lower cup 224, the fork is extended thereby advancing splitter 238 between the lip of the lower cup and the next cup in the stack (namely, 226). Splitter 238 is shown having a gentle arrow or ramped-shaped end facilitating penetration of the splitter between the lips of the cups. As the splitter separates the lower cup 224 from the stack, the profile 236 and stop 237 are simultaneously spaced from the cups thereby freeing the lower cup to fall.

Figure 11D:
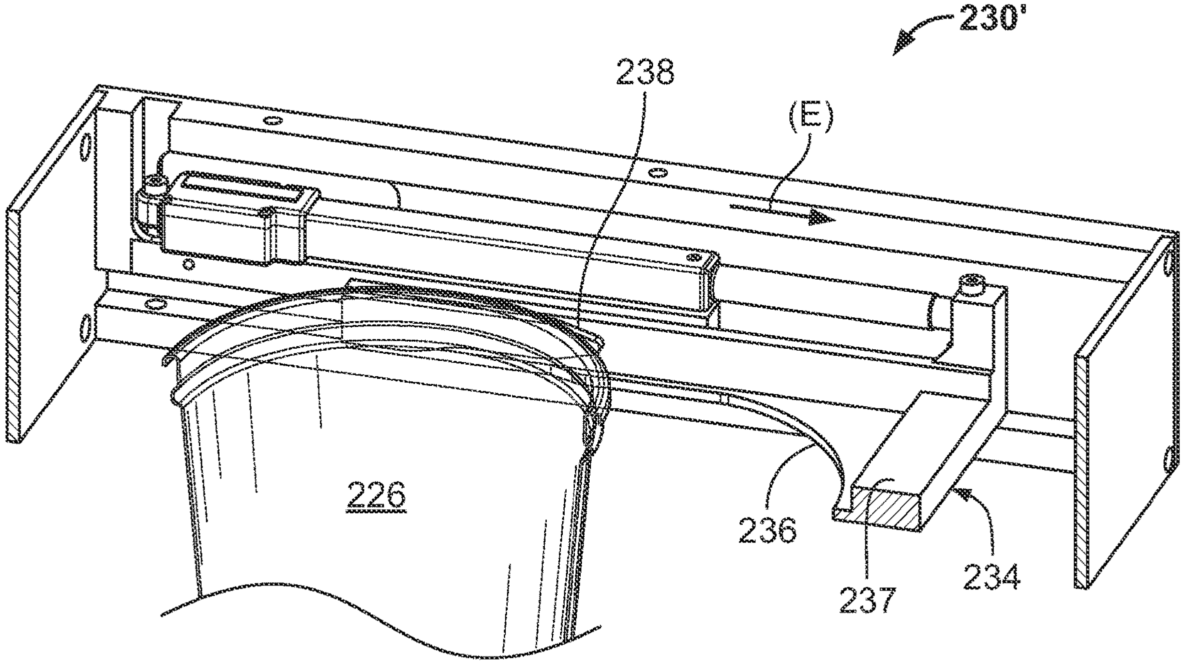

With reference to FIG. 11D, the fork 234 is shown in an extended position 230', in which the profile 236 and stop 237 are spaced from the cup stack and the lower cup has been ejected as described above. The station is arranged above the cup holder such that when the cup drops, it drops into the cup holder.

Figure 11E:
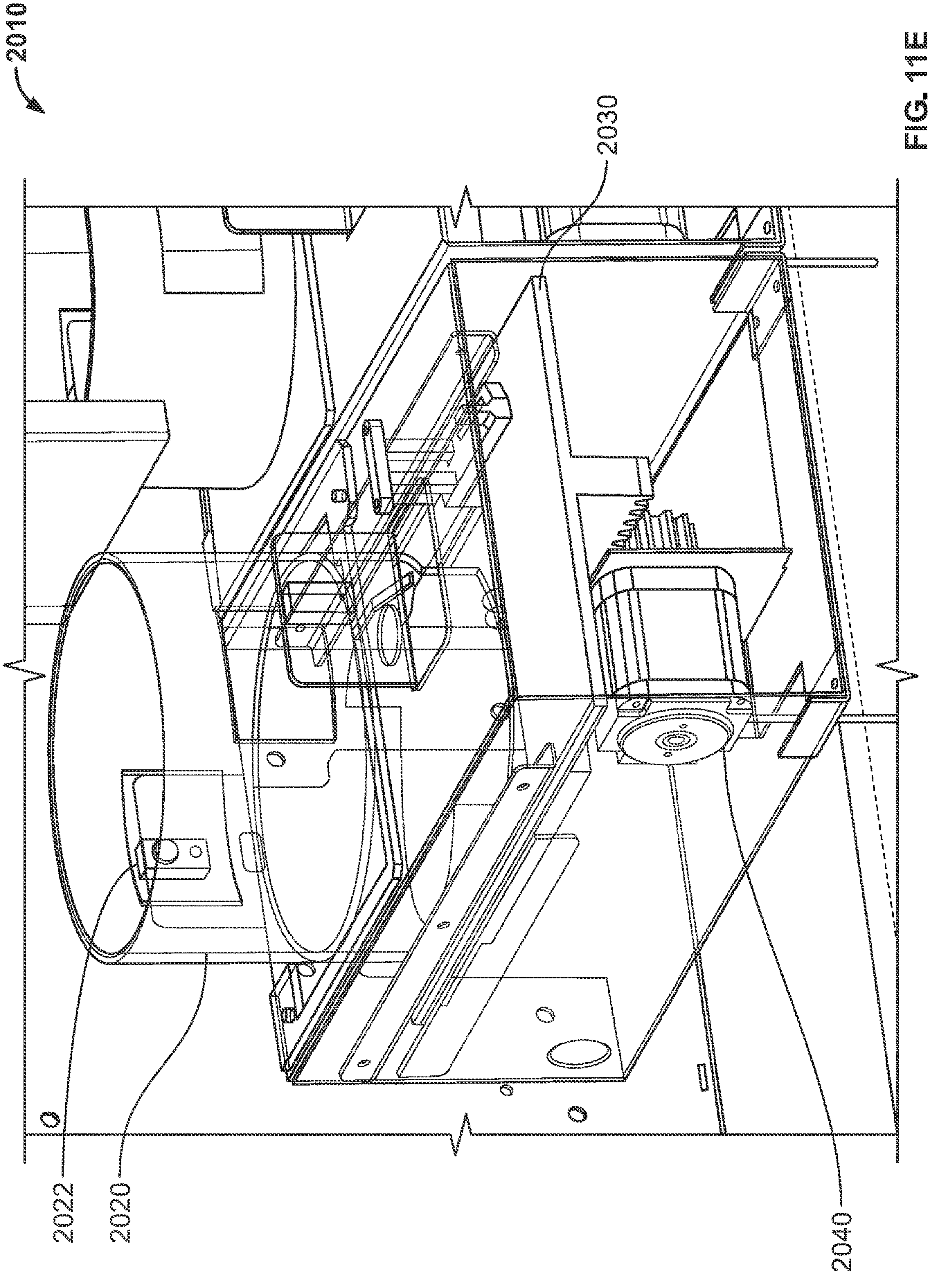
FIG. 11E is an enlarged view of a singulation unit in accordance with another embodiment of the invention.

FIG. 11E illustrates another cup separator 2010, and in particular, a cup separator for use in the cup singulating station 182 shown in FIGS. 1D-1F. Cup separator 2010 is shown including a collar 2020 serving to support a cup stack (not shown) and prevent the cups from dropping straight through. Collar 2020 may comprise a plastic or polymer material or inner coating or layer to slightly adhere, or otherwise grip the cups (not shown). Collar 2020 is shown including a window through which sensor 2022 is aimed to monitor the cup supply. Examples of sensors are described above in connection with FIG. 4.

Cup separator 2010 also includes a fork 2030 similar to that shown in FIGS. 1B-11D except the fork 2030 is shown being driven by a stepping motor 2040.

Figure 11F:
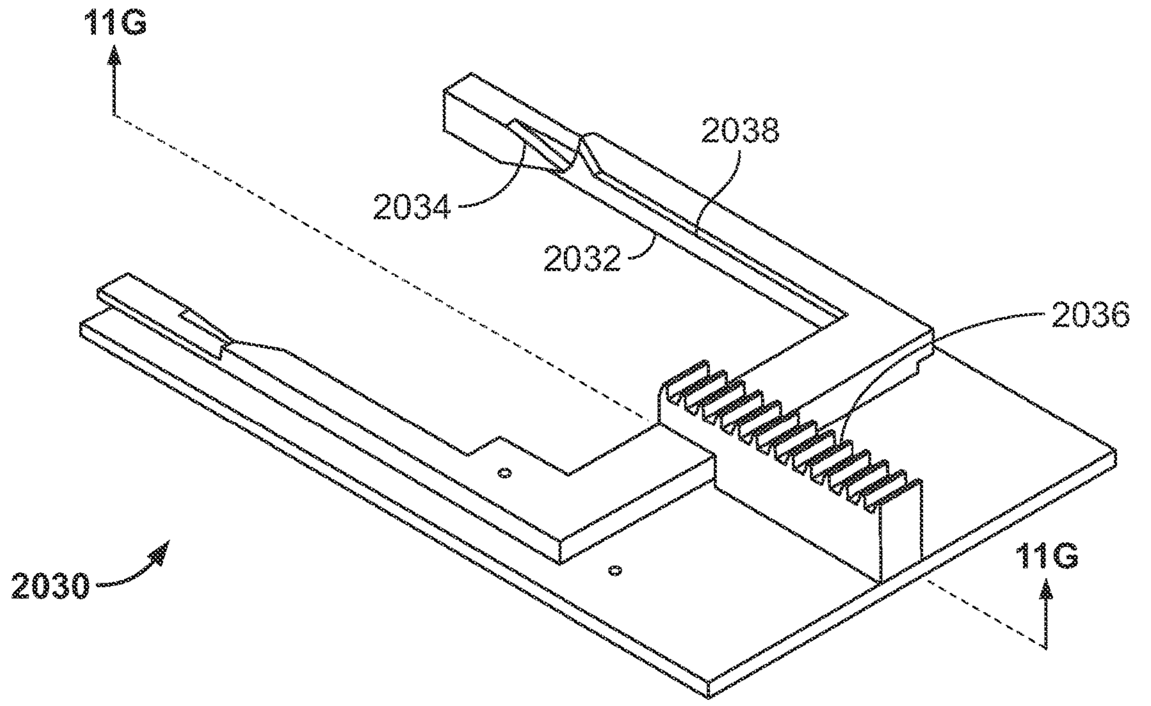
FIG. 11F is bottom perspective view of a component in the singulation unit shown in FIG. 11E.
Figure 11G:
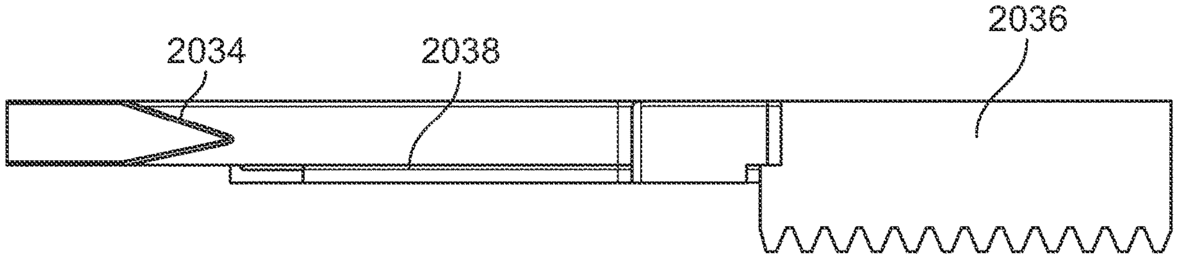
FIG. 11G is cross sectional view taken along line 11G-11G of the component shown in FIG. 11F.

With reference to FIGS. 11F-11G, fork includes a rack 2036 which is arranged to engage the gear or pinion of the motor 2040. Fork includes a square opening 2032 to receive the cup instead of the curved opening 236 described above in connection with FIGS. 11B-11D.

Fork 2030 is also shown with splitter 2034 and lip 2038. The splitter is arrow-shaped and operates with lip similar to that described above in connection with FIGS. 11B-11D to eject a cup from the stack of cups.

It is to be understood the shape of the fork may vary. For example, and with reference to FIG. 11H, a fork 2040 is shown in accordance with another embodiment of the invention. Fork 2040 includes an arrow shaped splitter defined by a straight upper or top surface and a non-linear lower surface 2054. The top and lower surfaces of the arrow are shown meeting at a vertex. In embodiments, the angle of slopes of upper and lower surfaces from horizontal range from 10-45 degrees, and more preferably are between 5 and 30 degrees.

Figure 11H:
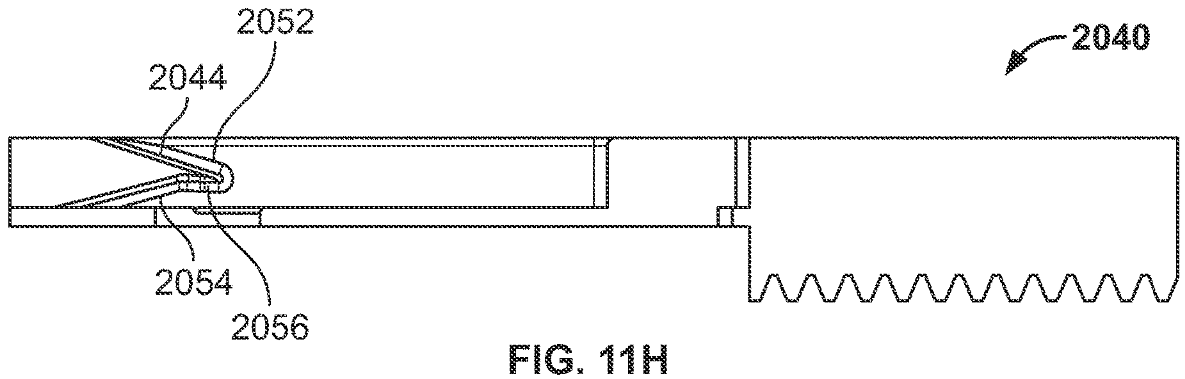
FIG. 11H is cross sectional view of another fork-shaped component in accordance with another embodiment of the invention.

In some embodiments such as the embodiment shown in FIG. 11H, the lower surface includes a short horizontal section 2056. Due to the horizontal section 2056 of the lower surface 2054, the splitter 2040 has a beak or hook shape. Indeed, the shape of the splitter may vary widely and the invention is intended to include many different types of shapes.

Proximity sensors (e.g., sensors 33-36 of FIG. 4) can be added to the singulation device 230 to verify the carriage is at a minimum (e.g., home 230) or maximum position (extended 230'). In embodiments, the ABDS monitors the position of the singulation device(s), as well as controls delivery of each cup to a cup holder.

Figure 12:
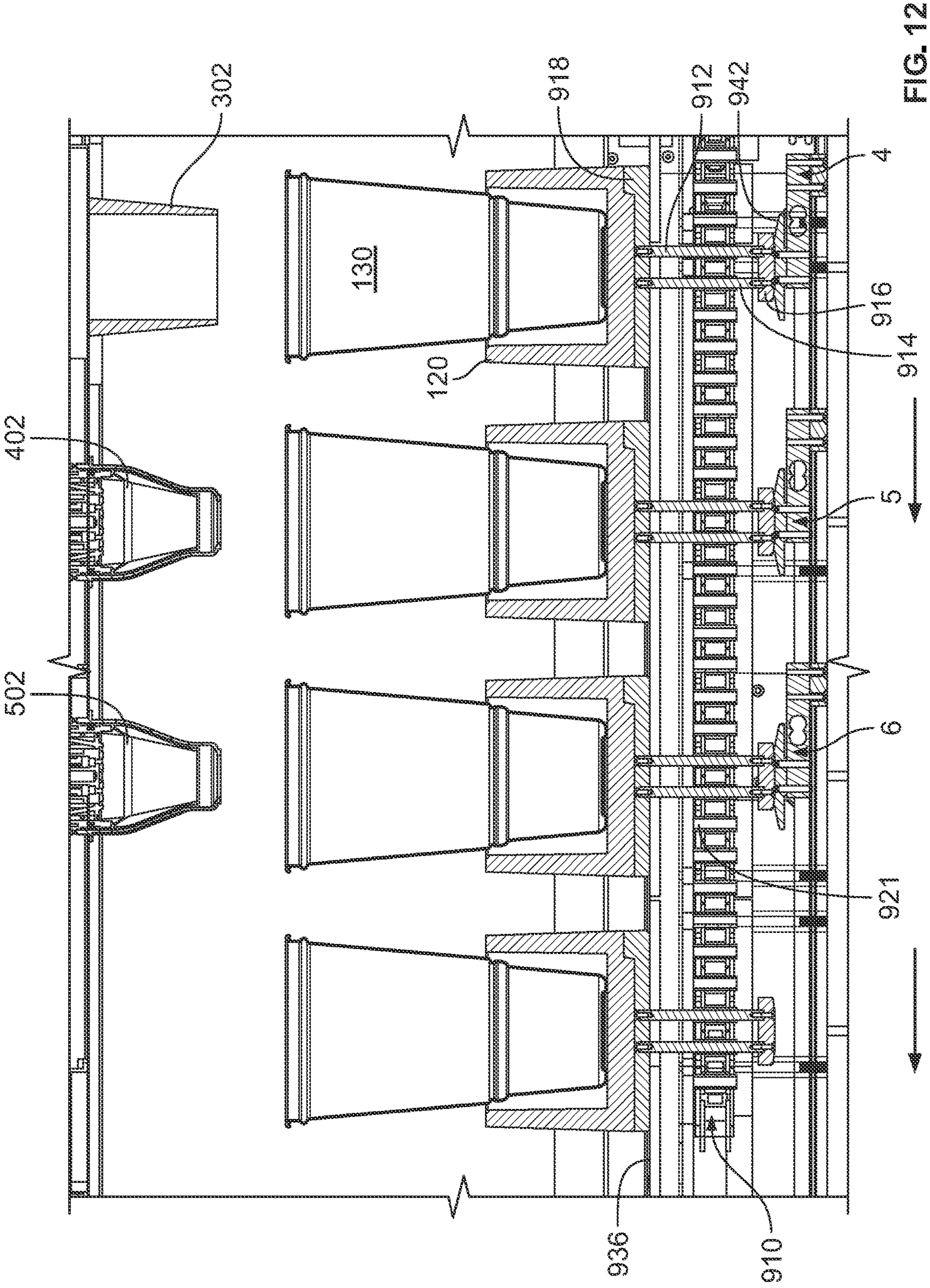
FIG. 12 is an enlarged partial cross sectional view of a conveyor assembly in the ice and beverage dispensing locations in accordance with an embodiment of the invention.

FIG. 12 shows an enlarged cross sectional view of the conveyor and cup assemblies, described above, at the ice dispensing and beverage dispensing locations in accordance with an embodiment of the invention. Each of the ice dispensing station, first beverage station, and second beverage station is shown having nozzle 302, 402, 502, respectively, aimed directly below towards a cup. The individual components of the cup assembly and load cell assemblies are also clearly illustrated for each station where the components share similar features to that described above in connection with FIG. 5A. However, it is to be understood that additional ice and dispensing stations may be incorporated along a conveyor path. In embodiments, for example, multiple ice stations and multiple beverage dispensing stations are incorporated along a conveyor path.

Figure 13:
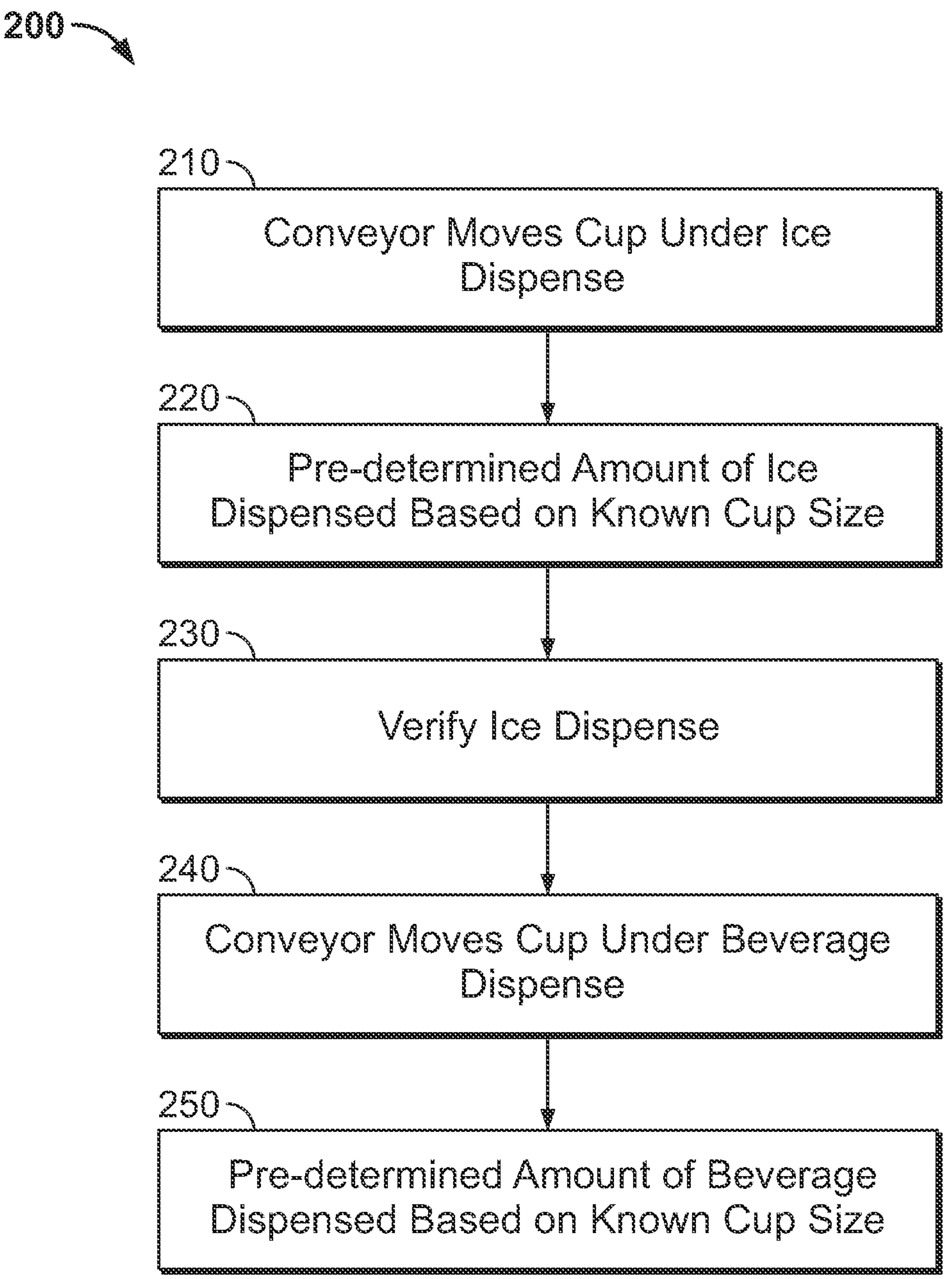
FIG. 13 is a flow chart of a method for dispensing ice and beverage into a cup in accordance with an embodiment of the invention.

With reference to FIG. 13, a flow chart illustrates a process for delivering ice and beverage to the cups in accordance with an embodiment of the invention.

Step 210 states to advance the cup 130 to the location under the ice dispenser nozzle 302. This step may be performed using the conveyor and cup assemblies as described above.

Step 220 states to dispense a predetermined amount of ice based on the known cup size. As stated herein, the system stores and updates the state of each location along the conveyor with information. Examples of information for each location 'a' to 'v' include without limitation: order number, time elapsed, drink type, cup size, and status. For example, the system is programmed to deliver about 15 fluid ounces of ice for a large cup (e.g., 40 fl. Oz.).

Various ice dispensers may be incorporated into the housing of the ABDS for controlled delivery of ice. In an embodiment, the ice dispenser includes an ice bin and an ice chute connecting the ice nozzle to the ice bin. The ice chute is angled downward so as to gravity feed ice to the ice nozzle. The ice delivery nozzle may include an auger therein. The auger may be driven by an auger motor to permit and move the ice through the nozzle. The predetermined amount of ice dispensed may be correlated to motor run time where the time is calibrated to the mass of ice ejected. The ABDS may have stored therein a database, look-up table, or other types of data structures and associated software so as to provide a targeted, predetermined amount of the ice for a given cup size. Moreover, modifications also may be requested, i.e., no ice, light ice, normal ice, or extra ice as directed by the input devices. An example of a commercially available ice maker is Model KMD-460MAJ, manufactured by Hoshizaki America Inc., (Peachtree City, GA). An example of a commercially available ice dispenser is Model IBD Bold i30, manufactured by Lancer Worldwide, (San Antonio, Texas).

Step 230 states to verify the ice has been dispensed into the cup. In the embodiment shown in FIG. 12, a load cell 4 is arranged under the cup holder assembly as described herein. The cup and entire cup holder assembly (including the cup holder 120, cup holder substrate 918, rods 912, 914, and base 916) is elevated onto load sensor 4 via ramp 942. When the base is elevated by the ramp, the entire weight of the cup assembly, cup, and cup contents are measured by the load sensor because the cup holder substrate is lifted from the rails 934, 936 and chain 910 of the conveyor. The ice may be weighed before and after delivery of the ice to the cup, and the initial value subtracted from the latter value for the weight of the ice-only. The weight of the ice may be compared to the weight of the predetermined amount of the ice. Ice may be dispensed into the cup until the measured amount of ice dispensed into the cup matches the predetermined amount.

Step 240 states to move the cup under the beverage dispenser. This is performed by the conveyor advancing the chain 910, and consequently each rod set, cup holder, and ultimately each corresponding cup into position under the beverage dispenser nozzle.

Step 250 states to dispense a predetermined amount of beverage (e.g., beverage volume "By") based on the known cup size. For example, the system is programmed to deliver about 20 fluid ounces of beverage for a large cup (e.g., 40 fl. Oz.). The ABDS may be programmed to accurately control the opening and closing of a valve for a predetermined amount of time correlated to a volume to plus or minus within ½ fl. Oz. In embodiments, the ABDS may have a database, recipe information, look-up table or other types of data structures and associated software so as to provide a targeted, predetermined amount of the beverage for a given cup size. Moreover, modifications also may be requested, i.e., no beverage, 50/50 beverage combo, 50/50 Coke®/Sprite®, 85/25 Diet Coke®/Dr. Pepper®, or other custom mixes as directed by input devices.

In embodiments, in the event less (or more) ice is requested in a customer order, the ABDS can be programmed to adjust the predetermined amount of beverage in proportion to the amount of ice ordered. For example, if 25% less ice is ordered by the customer, the ABDS computes a custom beverage volume to be added to the cup by adjusting the initial predetermined beverage volume (based only on cup size) by 25% to account for less ice added to the cup.

Optionally, the weight of the dispensed beverage may be measured and compared to the predetermined amount of beverage and more or less beverage may be dispensed into the cup to match the predetermined amount with the measured amount of beverage dispensed into the cup.

Various beverage dispensers may be incorporated into the housing of the ABDS for controlled delivery of beverage. An example of a commercially available beverage and ice dispenser is Model IBD Bold i30, manufactured by Lancer Worldwide, (San Antonio, Texas).

Top-Off Process

Optionally, after the beverage has been dispensed in step 250, a top off process dispenses additional beverage into the cup to fill the cup to the top (e.g., within ¼ to ½ inches of the rim). In a preferred embodiment of the invention, the top off volume (TOV) is computed as follows:

$$\text{TOV}=\text{cup volume (CV)}-\text{Beverage/Ice Mixture Volume (MV)} \quad \text{(a)}$$

Convert dispensed beverage volume (BV) described above with reference to step 250 to weight of beverage (WB). (b)

Weigh mixture of the ice and beverage (WT) (c)

Compute weight of ice (WI)=WT−WB (d)

Convert WI to ice volume IV (e)

Compute MV=IV+BV (f)

Compute TOV=CV−MV (g)

The above described top-off computation is performed without measuring the weight of the ice. This has an advantage of saving a step and not requiring one to measure the ice (or use the measured ice weight) in computing a top-off volume. However, it is to be understood the invention may vary and the invention can employ a wide range of logic rules to determine the beverage volumes to be dispensed whether initially or to top off the mixture. Additionally, in embodiments, the TOV computation is skipped altogether.

In embodiments, the TOV ranges between 1-10%, preferably about 5% of the cup volume.

With reference again to FIG. 12, a second beverage pour nozzle 502 is shown. In embodiments, the conveyor is programmed to beverage-fill (and optionally, top off) two cups in parallel. Additionally, more than one top off cycle may be performed. The second beverage dispensing station 500 and nozzle 502 may be similar to that described above in connection with first beverage dispensing station 402. Desirably, some components in the beverage dispensing stations may be shared such as certain liquid and syrup sources, refrigeration units, power, etc.

In embodiments, the ABDS is programmed to fill a first cup with ice at the ice station, advance the conveyor one position, deliver ice to a second cup in the ice location (while not delivering beverage to the first cup), then advance the first and second cups to the first and second beverage dispensing stations, respectively. Then, simultaneously fill the first and second cups. This parallel beverage dispensing process has advantage in efficiency because the beverage-filling step requires the most time of all the steps. For extra-large cups, the improvement in efficiency is greatest.

Cup Sealing Station

After the cup is properly filled with beverage and ice, the cup is optionally sealed or lidded.

In embodiments of the invention, to facilitate accurate position of the cup for the lift assembly, the cup proximity along the route to the lift station is sensed. To this end, a sensor array (e.g., sensors 30-32 of FIG. 4) can be arranged to detect the proximity of the cup along the conveyor route to the sealer unit 184, 600.

Next, and as described above in connection with FIGS. 6A-10, the cup can be controllably lifted into the sealing unit at the sealing station 184, 600, sealed, and returned to the cup holder substrate on the conveyor (see, e.g., FIGS. 1A, 1B, 1C, 2, 4). Optionally, a sensor may be added to verify the cup holder is properly reseated on the cup holder substrate.

Finally, a limit home switch (e.g., a limit switch 40 of FIG. 4) can verify the elevator carriage (e.g., 642, 1040) is lowered prior to advancing the conveyer.

In embodiments of the invention, the ABDS system is arranged to lift a cup holder from the cup substrate, and from the conveyor. The shapes and cooperation between the cup holder, cup holder substrate, chain and conveyor enable the beverage-filled cups to be automatically lifted from the conveyor into a wide range of types of commercially available sealing machines. Any one of a wide variety of types of film sealing machines may be incorporated into the larger automated beverage system described herein for covering or sealing the top of the cup with a cover or thin liquid-tight film. Additionally, in embodiments, the film can have a designated area for puncture with an implement such as a straw. A non-limiting example of a commercially available cup sealing machine that may be incorporated into the larger automated beverage system machine is the CP Pro, manufactured by Georgia-Pacific Consumer Products LP, (Atlanta, Georgia). Examples of other sealing machines that may be incorporated into the larger ABDS machine are described in U.S. Patent Publication Nos. 2020/0172272 to Cittadino et al.; and 2020/0231311 to Kimmo; and U.S. Pat. No. 3,838,805 to Amberg and U.S. Pat. No. 4,050,971 to Verkins et al., each of which is incorporated herein by reference for all purposes.

Printing/Labeling

In embodiments, the ABDS may include a printing or labeling station (not shown) to add text, indicia, graphics, logos, or a bar code onto the cup or top film. The printing station may include one or more printing heads or label dispensers. The information may include a name, beverage type, order number, order part of total order, color code, advertisement, nutritional information, coupon, prize, and the like. Indeed, any type of information, designs, or other indicia may be printed thereon.

Additionally, the printing and labeling station may be positioned anywhere along the conveyor route when placed on the cup. If placed on lid, the printing and labeling station is desirably placed downstream of the sealing/lid assembly.

Staging Area

Figure 14:
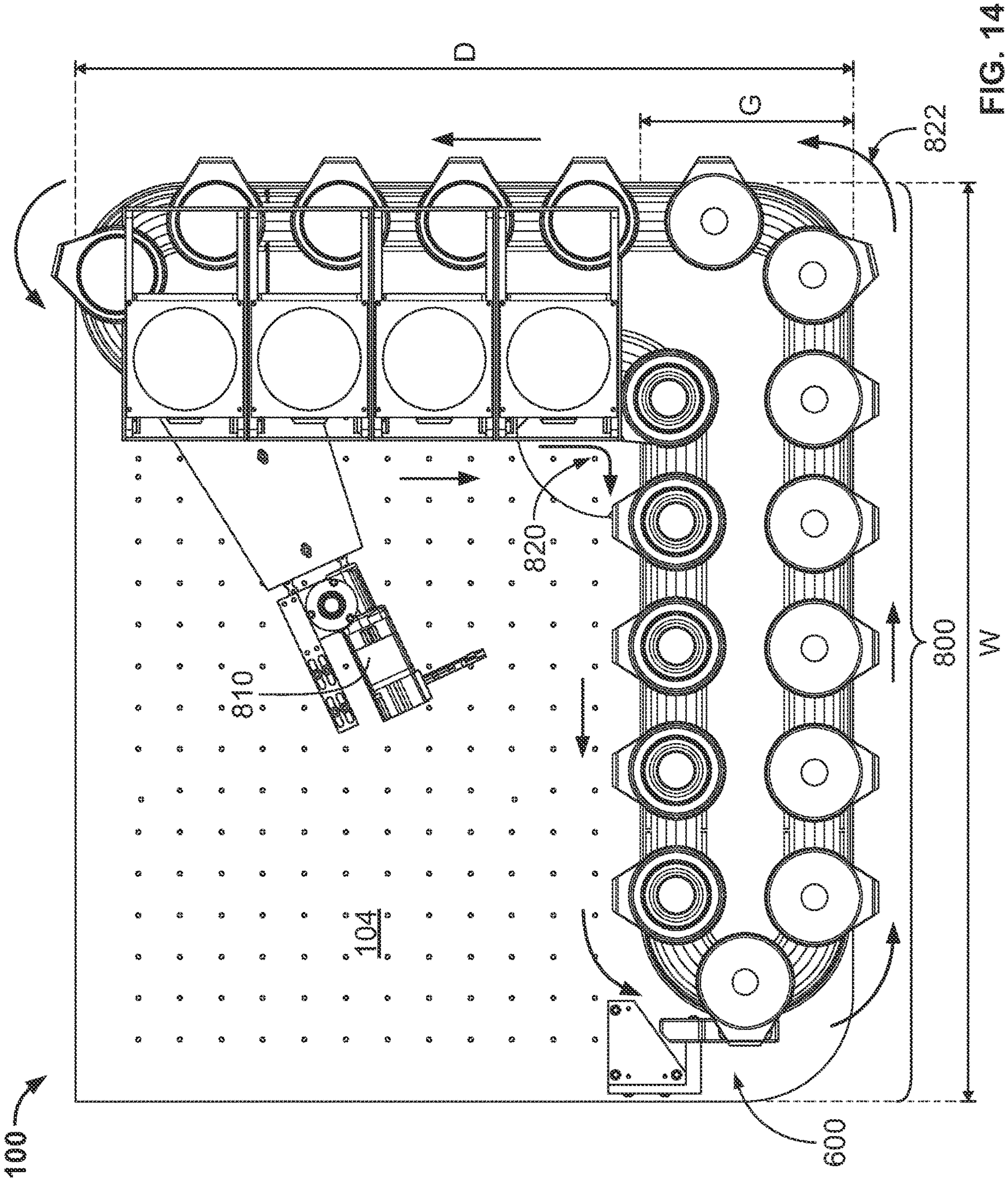
FIG. 14 is a top view of an automated beverage dispensing system with the functional stations and housing removed to more clearly show the staging area in accordance with an embodiment of the invention.

FIG. 14 shows a top view of a conveyor route with the housing and other stations removed for facilitating understanding of the invention.

The conveyor route shown in FIG. 14 is a continuous “L”-shaped route including a right turn 820 and left turn 822 as well as two U-turns. Such combination of turns raises challenges in conventional fixed conveyor carriages. Additionally, conventional conveyor designs include a lack of the capability to both (a) lift the entire cup assembly for various functional steps, as well as (b) free float the entire cup assembly for weighing. As described above, embodiments of the invention solve these challenges. An advantage of the L-shaped conveyor described herein over other shapes of conveyors is that the subject L-shaped route includes more functional length for the same machine footprint. Stated alternatively, the L-shaped conveyor described herein provides more useful length in an efficient/small footprint than other shaped conveyors.

Also, while the conveyor route is shown comprising a plurality of locations going in sequence from ‘a’ to ‘v’, the invention is not so limited except where recited in any appended claims. Indeed, more or less conveyor locations may be added to accommodate additional stations or larger demand. However, in some embodiments, a compact design is desired and stations may be removed or the route adjusted to occupy a smaller footprint. Examples of conveyor route shapes include, without limitation, L, O, D, J, T, U. Non-limiting exemplary dimensions for the conveyor path are width W (40 to 48 inches), depth D (30 to 40 inches), and gap G ($1/16$ to 2 inches).

With reference again to FIG. 14, after the cups are sealed at station 600, they are advanced to staging area 800. Staging area is shown towards the front of the ABDS. There are 6 staging locations on the front of the ABDS shown in FIG. 14, each of which has associated therewith various attributes. As described above, in embodiments, the ABDS records the order number, status, drink, time, number, and state of each location along the conveyor.

Figure 15:
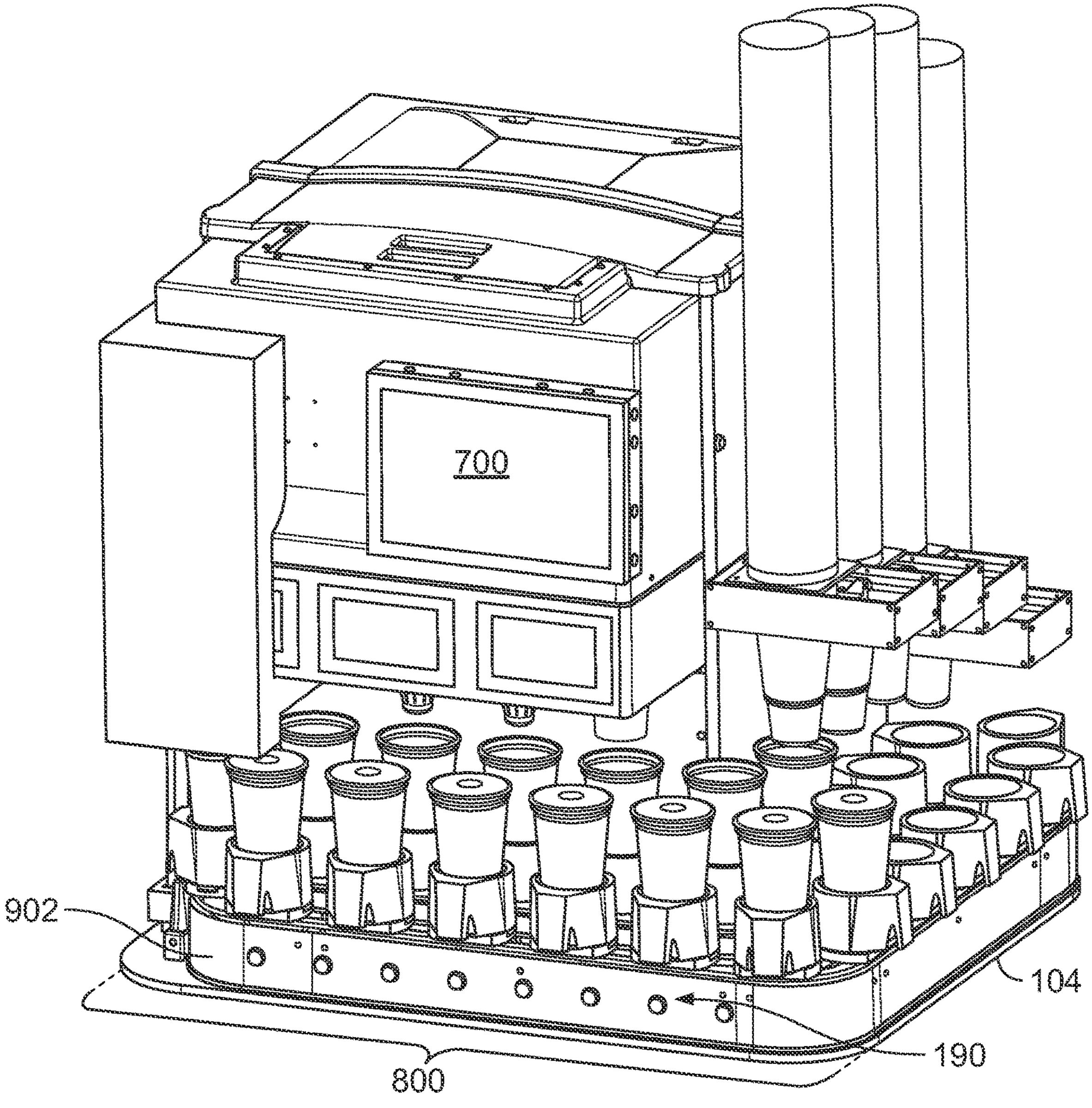
FIG. 15 illustrates a light indicator array for an automated beverage dispensing system in accordance with an embodiment of the invention.

With reference to FIG. 15, a display 700 can be arranged on the front of the ABDS to visually show the attributes of each location (e.g., small, cola, order no. 003, status, etc.).

Additionally, the staging area 800 may include an on-board visual indicator 190. The indicator 190 may be programed with the computer system to, for example, identify cups in the same order, cancelled orders, errors, or other information. For example, an LED array 190 is shown arranged on skirt 902 to indicate cups in the same order, size, age, etc. by illumination color, pattern, or intensity. For example, the lights associated with cups in same order may be green. A light associated with a cup of a cancelled order may be red. A light associated with a cup of an urgent order may be flashing, brighter, or have a higher intensity than the other lights. Indeed, many variations to the pattern, colors, and intensity of the lights may be programmed by the computer.

GUI

Figure 16:
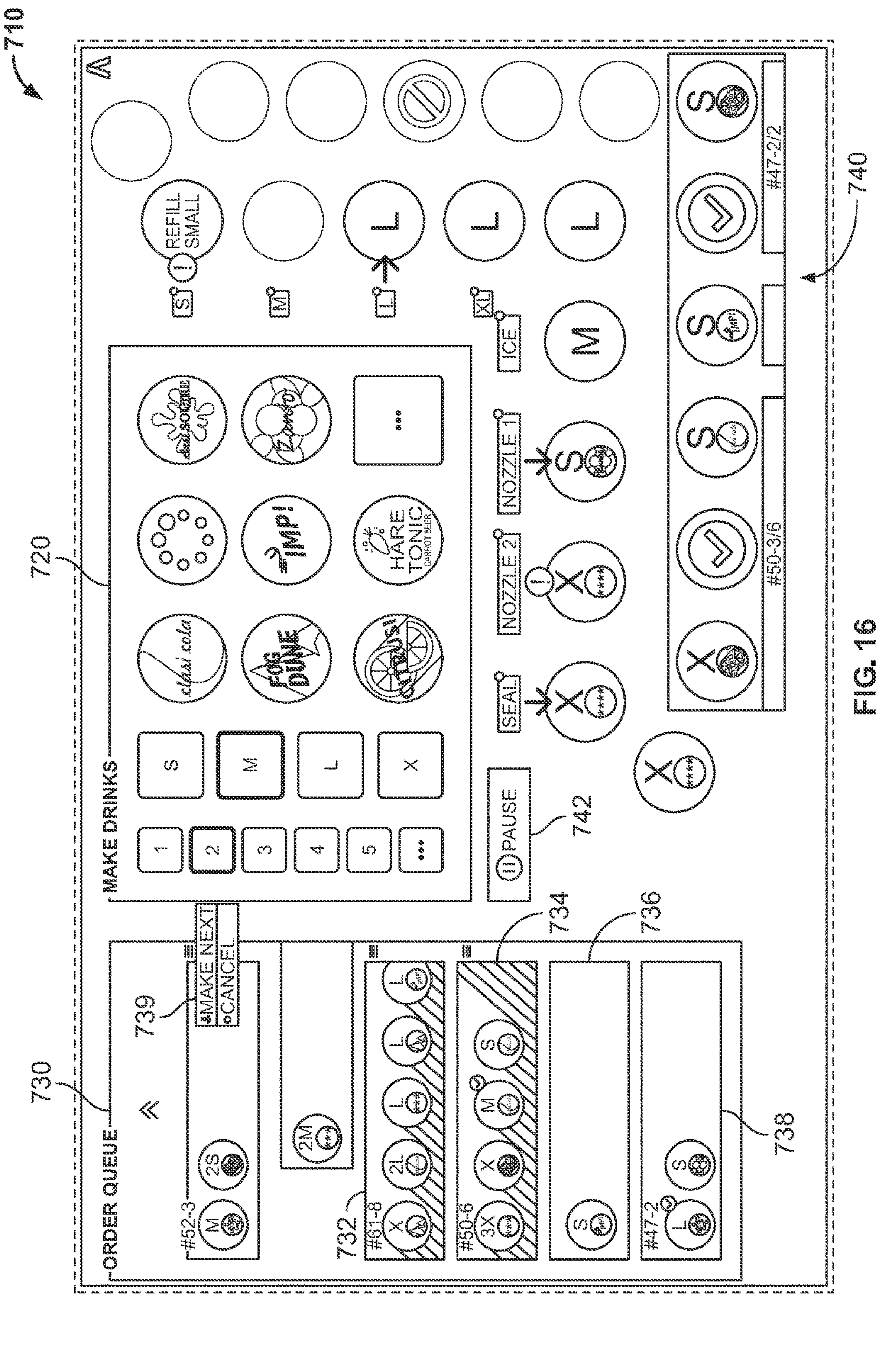
FIG. 16 illustrates a graphical user interface for a display of an automated beverage dispensing system in accordance with an embodiment of the invention.

FIG. 16 illustrates a graphical user interface (GUI) 710 of a display 700 for communicating instructions and status of beverage orders with workers or customers in accordance with an embodiment of the invention. The GUI 710 shows an instruction window 720 to make drinks, a queue window 730, and a conveyor window 740.

Instruction window 720 shows a menu including three categories of buttons including quantity, size, and type (e.g., brand). As an instruction is entered, the computer system is operable to assign an order number to the order. In embodiments, the instruction window is operable to receive custom orders of drinks by an operator, and to communicate with the computer to prepare each drink order as described herein. In the instruction window 720 shown in FIG. 16, tabs are displayed for number, size, and type. Additional tabs can be provided to access additional commands, numbers, and letters to make a wide range of customizations. The instruction window 720 is operable to allow an operator to directly input a complete drink order including customizations.

Queue window 730 shows in graphical form each order as a set 732, 734, 736, 738, etc. Each order is showing a color code (which may be applied in the LED array described herein), quantity, size, type of beverages. A button in the order queue 739 also allows for the operator to cancel or make next a particular order.

Conveyor window 740 shows a real time graphical illustration (e.g., birds eye view) of the L-shaped conveyor route including cups in each location along the route. The conveyor window shows the information for each location including the order group (by, e.g., color), the size (e.g., S, X, L, M), the beverage type (symbol), part of total order (e.g., 2 of 4), and status of each cup per location. Additionally, in the conveyor window shown in FIG. 16, an arrow indicates an action is in process, and exclamation point indicates an item requires operator attention, and a large checkmark indicates the drink has been removed from the conveyor. Additionally, a button for pause 742 is shown to pause the entire system by the operator. In embodiments, the GUI is programmed such that each icon can be customizable.

Cleaning

The conveyor and stations can be mounted to plate 104 so as to be removable for cleaning. Additionally, the conveyor motor 810 can be raised from the plate so that drips and spills will not land on the conveyor motor. Preferably, the plate 104 has apertures and is positioned over a drain pan.

Figure 17:
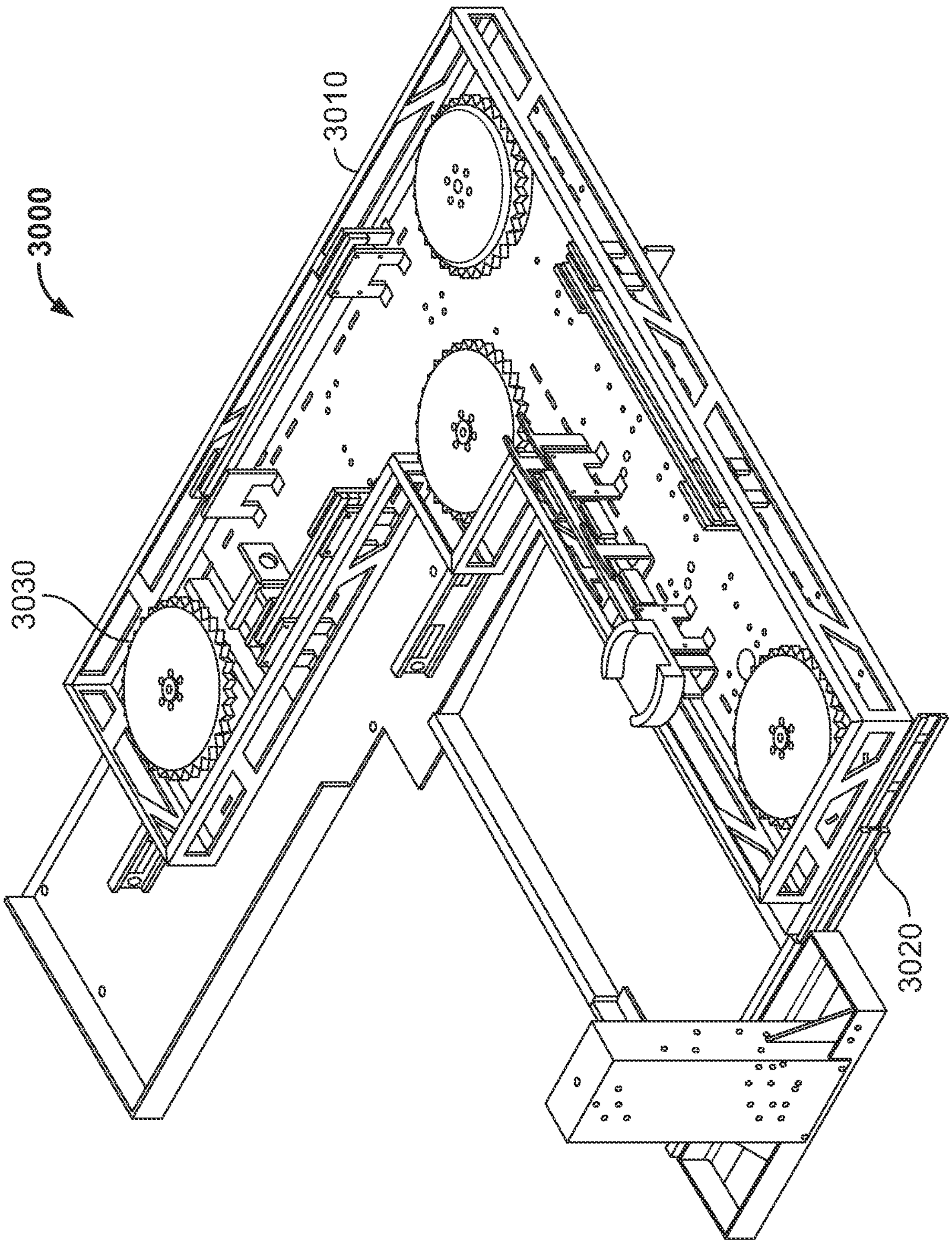
FIG. 17 is a partial left side perspective view of a conveyor assembly including linear slides shown in an extended configuration in accordance with another embodiment of the invention.
Figure 18:
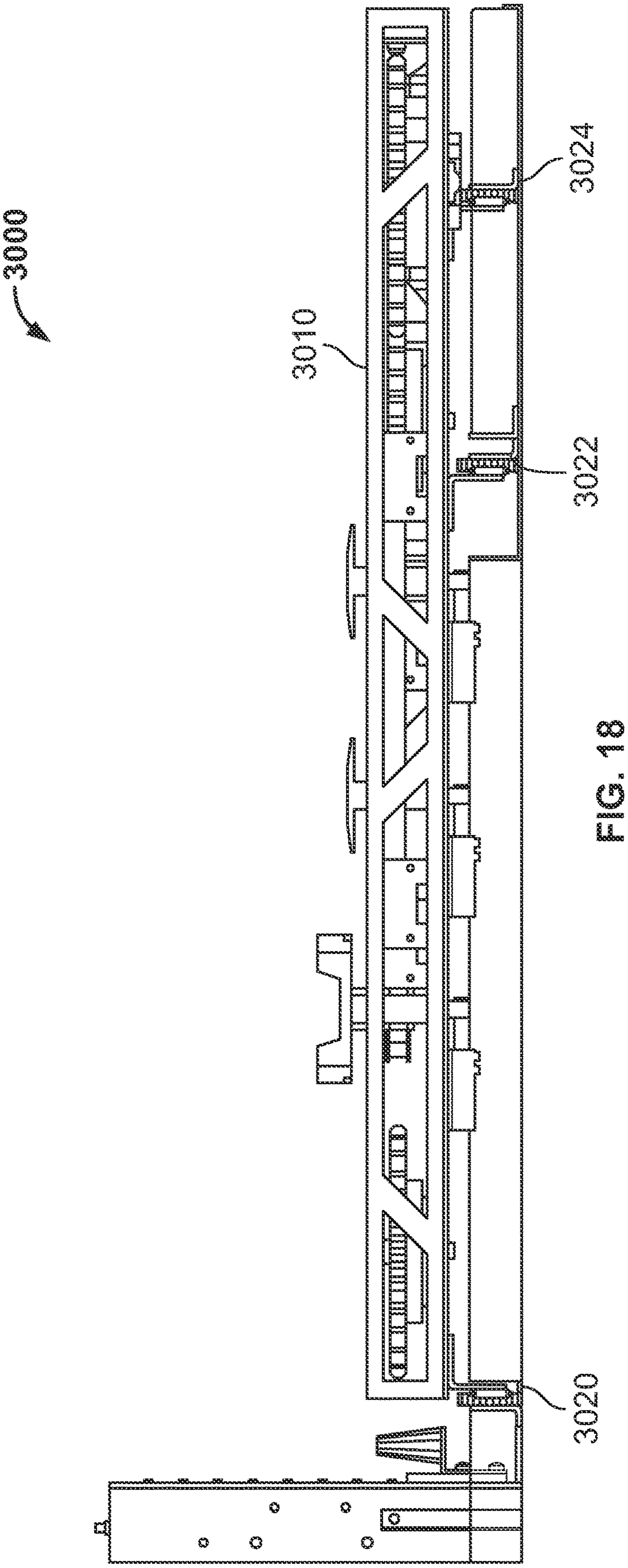
FIGS. 18-19 are front and bottom perspective views of the conveyor assembly shown in FIG. 17.
Figure 19:
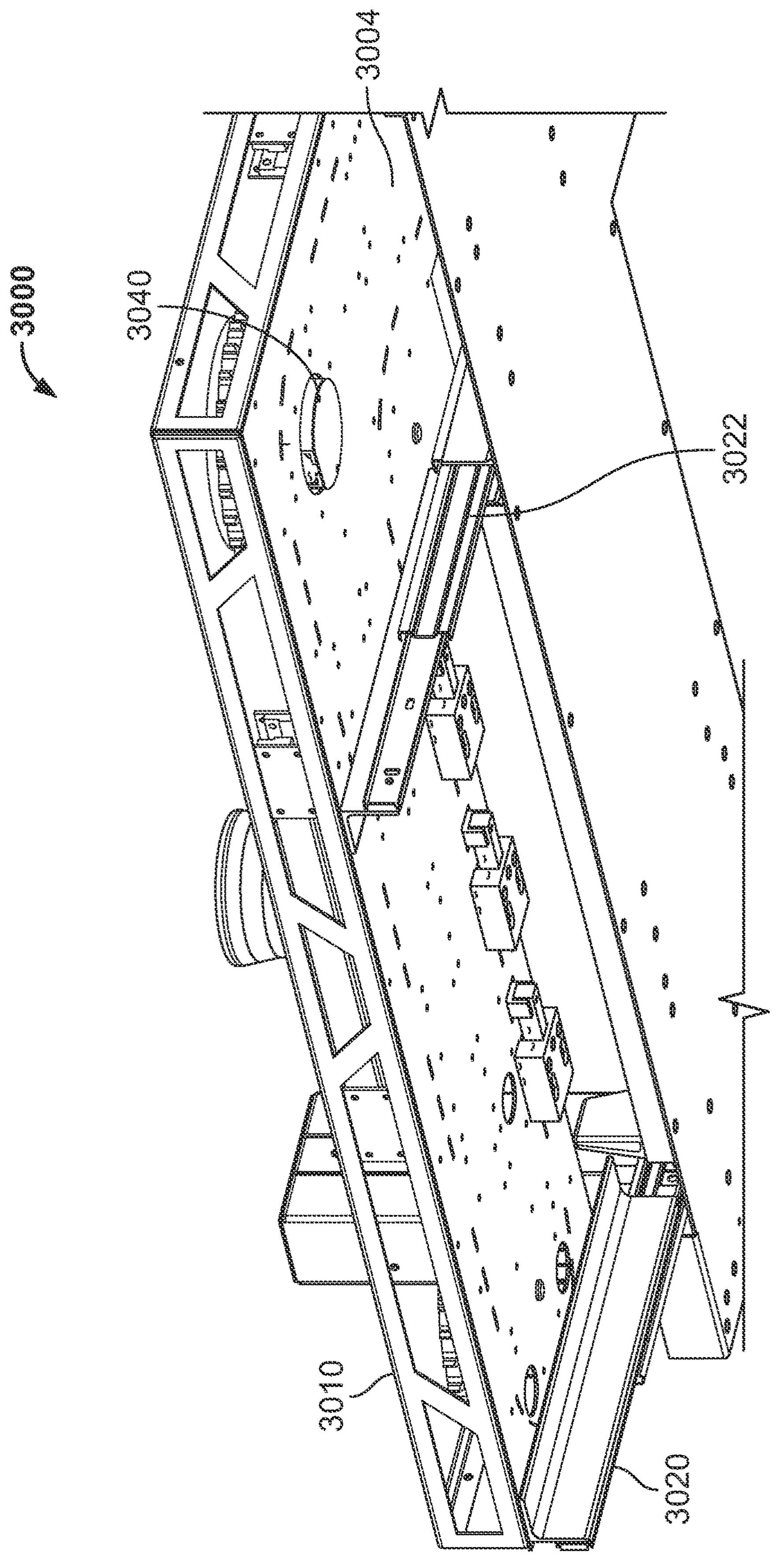

FIGS. 17-19 illustrate various partial views of an ABDS system 3000 in which the functional stations have been removed for facilitating understanding of the invention. Particularly, FIGS. 17-19 show the conveyor frame 3010 mounted on slides 3020, 3022, and 3024 and in an extended position. The linear slides allow the whole conveyor assembly (including the gears 3030 and motor 3040) to be conveniently serviced without having to remove or dismantle any of the functional stations.

With reference to FIG. 19, a bottom perspective partial view of the ABDS 3000 is shown. Frame 3010 is mounted on slides 3020. Base of motor is shown 3040 protruding from the plate 3004. Unlike the motor and drive train 810 shown in FIG. 14, the motor 3040 is relatively small and directly connectable via gear 3040 to the chain (not shown) of the conveyor. Small electric motors are desired that may be directly mounted to the plate 3004. The conveyor and motors may be removed from the system as one piece for servicing.

Applications

The beverage dispensing system described herein may be used in various applications including, for example, behind a counter or a crew serve environment, as well as in a freestanding or customer serve mode. For example, any or all of the stations may be positioned within an enclosure and out of direct contact with a customer. The customer's access may be limited to only an input device and the staging area. In such embodiments, the customer can request a beverage via the input device. The sealed cup (including ice and beverage therein) is then presented to the customer within the staging area.

Still other modifications and variations can be made to the disclosed embodiments without departing from the subject invention. For example, additional functional buttons, GUIs, functional stations along the conveyor route, and other components may be included in an ABDS. Additionally, in embodiments, the ABDS may have less functional stations and components than that shown and described herein.

The invention claimed is:

1. An automated beverage dispensing system for dispensing beverage into a cup according to an order, the system comprising:

- a conveyor defining a continuous conveyor route;
- at least one cup holder assembly operable with the conveyor to move along the conveyor route; wherein the cup holder assembly comprises a cup holder for holding the cup,
- a lift adapted to interlock with the cup holder and to elevate the cup holder and cup therein from the conveyor;
- a plurality of functional stations positioned along the conveyor route, wherein said plurality of functional stations comprise:
  - a singulation station operable to eject a cup into a cup holder assembly,
  - an ice dispensing station operable to dispense ice into the cup,
  - a first beverage dispensing station operable to dispense beverage into the cup,
  - a sealing station operable to lid or seal the top of the cup,
  - a staging station operable to stage or present beverage-filled cups in an area for pickup; and
- a computer system programmed and operable to control the conveyor, lift, and functional stations.

2. The automated beverage dispensing system of claim 1, further comprising at least one ramp arranged with the conveyor to float the cup holder assembly above the conveyor, and wherein the ramp is coupled to a weight sensor such that the cup holder assembly can be weighed without interference from the conveyor.

3. The automated beverage dispensing system of claim 1, comprising a plurality of cup holder assemblies arranged in a single file along the conveyor route.

4. The automated beverage dispensing system of claim 1, wherein the conveyor is mounted to a set of linear slides such that the conveyor is laterally extendable from beneath the functional stations.

5. The automated beverage dispensing system of claim 1, further comprising a display programmed and operable to visually show drink order status along the conveyor route.

6. The automated beverage dispensing system of claim 1, wherein the singulation station comprises a movable fork to separate one cup from a cup stack, and wherein the fork comprises an arrow-shaped splitter that separates a first cup lip from an adjacent cup lip in the cup stack.

7. The automated beverage dispensing system of claim 1, wherein the conveyor route comprises a first route and a second route substantially perpendicular to the first route.

8. The automated beverage dispensing system of claim 1, wherein system comprises a footprint having a length, depth, and width wherein each of the length, depth, and width is less than 45 inches.

9. The automated beverage dispensing system of claim 1, wherein the cup singulation station is arranged on the side of the beverage dispensing station.

10. The automated beverage dispensing system of claim 1, wherein the computer is programmed and operable to compute a beverage top-off amount.

11. The automated beverage dispensing system of claim 1, wherein the computer is programmed and operable to update and store status information of each of the functional stations, each cup in transit along the conveyor route, and the order.

12. The automated beverage dispensing system of claim 1, wherein the conveyor route comprises a first route portion extending along the front of the beverage dispensing station and a second route portion extending along the side of the beverage dispensing station.

13. The automated beverage dispensing system of claim 12, wherein the first route portion and second route portion form an L-like shape.

14. The automated beverage dispensing system of claim 1, wherein the cup holder assembly further comprises a cup holder substrate that is adapted to (a) interlock with the conveyor, and (b) removably engage the cup holder such that the cup holder can be freely elevated from the cup holder substrate and the conveyor.

15. The automated beverage dispensing system of claim 14, wherein the conveyor comprises a chain comprising a plurality of hollow pins.

16. The automated beverage dispensing system of claim 15, wherein the cup holder assembly comprises at least one rod, and the at least one rod is vertically slidably positioned in one of said hollow pins of the chain such that the cup holder assembly is laterally moved when the chain is moved and is vertically free to be elevated when the cup holder is elevated from the conveyor.

17. The automated beverage dispensing system of claim 16, wherein the lift is located along the conveyor path to elevate the cup into the sealing station.

18. The automated beverage dispensing system of claim 17, further comprising at least one sensor to detect the presence of a cup in the vicinity of the sealing station.

19. An automated beverage dispensing system for dispensing beverage into a cup according to an order, the system comprising:

a conveyor defining a continuous conveyor route;

at least one cup holder assembly operable with the conveyor to move along the conveyor route;

a plurality of functional stations positioned along the conveyor route, wherein said plurality of functional stations comprise:

a singulation station operable to eject a cup into a cup holder assembly, an ice dispensing station operable to dispense ice into the cup, a first beverage dispensing station operable to dispense beverage into the cup, a sealing station operable to lid or seal the top of the cup, a staging station operable to stage or present beverage-filled cups in an area for pickup; and a computer system programmed and operable to control the conveyor and functional stations; and wherein the conveyor is mounted to a set of linear slides such that the conveyor is laterally extendable from beneath the functional stations.

20. The automated beverage dispensing system of claim 19, wherein the computer is programmed and operable to compute a beverage top-off amount.

21. The automated beverage dispensing system of claim 19, further comprising a lift operable to elevate a cup holder of the cup assembly from the conveyor.

22. The automated beverage dispensing system of claim 21, wherein the computer system is programmed and operable to control the lift to elevate the cup holder when applying a lid or seal to the cup at the sealing station.

* * * * *